United States Patent
Jin et al.

(10) Patent No.: US 10,048,855 B2
(45) Date of Patent: Aug. 14, 2018

(54) MOBILE APPARATUS PROVIDING PREVIEW BY DETECTING RUBBING GESTURE AND CONTROL METHOD THEREOF

(71) Applicant: Samsung Electronics Co., Ltd., Suwon-si, Gyeonggi-do (KR)

(72) Inventors: Hyung-Joo Jin, Seoul (KR); Jae-Myoung Lee, Seoul (KR); Chul-Ho Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 14/177,842

(22) Filed: Feb. 11, 2014

(65) Prior Publication Data

US 2014/0258866 A1 Sep. 11, 2014

(30) Foreign Application Priority Data

Mar. 6, 2013 (KR) .................. 10-2013-0023872

(51) Int. Cl.
| | | |
|---|---|---|
| *G06F 3/048* | (2013.01) |
| *G06F 3/0488* | (2013.01) |
| *G06F 3/0482* | (2013.01) |
| *G06F 3/0484* | (2013.01) |
| *G11B 27/34* | (2006.01) |
| *G11B 27/10* | (2006.01) |

(52) U.S. Cl.
CPC .......... *G06F 3/0488* (2013.01); *G06F 3/0482* (2013.01); *G06F 3/04842* (2013.01); *G06F 3/04883* (2013.01); *G11B 27/105* (2013.01); *G11B 27/34* (2013.01)

(58) Field of Classification Search
CPC ............. G06F 3/04883; G06F 3/04842; G06F 3/0488; G06F 3/0482; G06F 3/0481; G06F 3/0485; G06F 17/50; G06F 19/12; G06F 19/3437
See application file for complete search history.

(56) References Cited

U.S. PATENT DOCUMENTS

| | | | |
|---|---|---|---|
| 5,583,791 A | 12/1996 | Harigaya et al. |
| 8,331,685 B2 | 12/2012 | Pettigrew et al. |
| 9,030,419 B1* | 5/2015 | Freed .................... G06F 3/0416 345/156 |
| 2009/0300553 A1* | 12/2009 | Pettigrew .............. G06T 7/0085 715/856 |
| 2010/0107046 A1* | 4/2010 | Kang .................... G06F 3/0482 715/207 |

(Continued)

FOREIGN PATENT DOCUMENTS

| | | |
|---|---|---|
| CN | 101799737 A | 8/2010 |
| CN | 102369501 A | 3/2012 |

(Continued)

*Primary Examiner* — Di Xiao
(74) *Attorney, Agent, or Firm* — Jefferson IP Law, LLP

(57) ABSTRACT

A mobile apparatus control method that detects a gesture to provide a preview is provided. The method includes displaying a thumb-nail of video contents on a touch screen, detecting a rubbing gesture on the thumb-nail of the video contents displayed on the touch screen, and displaying the preview of the video contents on the touch screen when the rubbing gesture is detected.

18 Claims, 18 Drawing Sheets

(56) References Cited

U.S. PATENT DOCUMENTS

| | | | |
|---|---|---|---|
| 2010/0241699 A1* | 9/2010 | Muthukumarasamy | G06F 17/30035 709/203 |
| 2011/0022643 A1 | 1/2011 | Jalon et al. | |
| 2011/0096097 A1* | 4/2011 | Matsuki | G03G 15/5016 345/684 |
| 2011/0119578 A1* | 5/2011 | Schwartz | G06F 3/0485 715/702 |
| 2011/0296328 A1* | 12/2011 | Jikeya | G06F 3/04817 715/769 |
| 2011/0304584 A1 | 12/2011 | Hwang | |
| 2012/0086877 A1* | 4/2012 | Kaoh | H04N 21/42201 348/836 |
| 2012/0131454 A1* | 5/2012 | Shah | G06F 3/04883 715/702 |
| 2012/0144330 A1* | 6/2012 | Flint | G06F 3/04847 715/765 |
| 2012/0221950 A1 | 8/2012 | Chao et al. | |
| 2012/0321280 A1 | 12/2012 | Lin | |
| 2013/0055087 A1* | 2/2013 | Flint | G11B 27/034 715/723 |
| 2013/0307792 A1* | 11/2013 | Andres | G11B 27/005 345/173 |
| 2013/0326583 A1* | 12/2013 | Freihold | G06F 3/04815 726/3 |

FOREIGN PATENT DOCUMENTS

| | | |
|---|---|---|
| CN | 102612679 A | 7/2012 |
| CN | 103905909 A | 7/2014 |
| KR | 10-2012-0049291 A | 5/2012 |
| WO | 2012/075295 A2 | 6/2012 |

\* cited by examiner

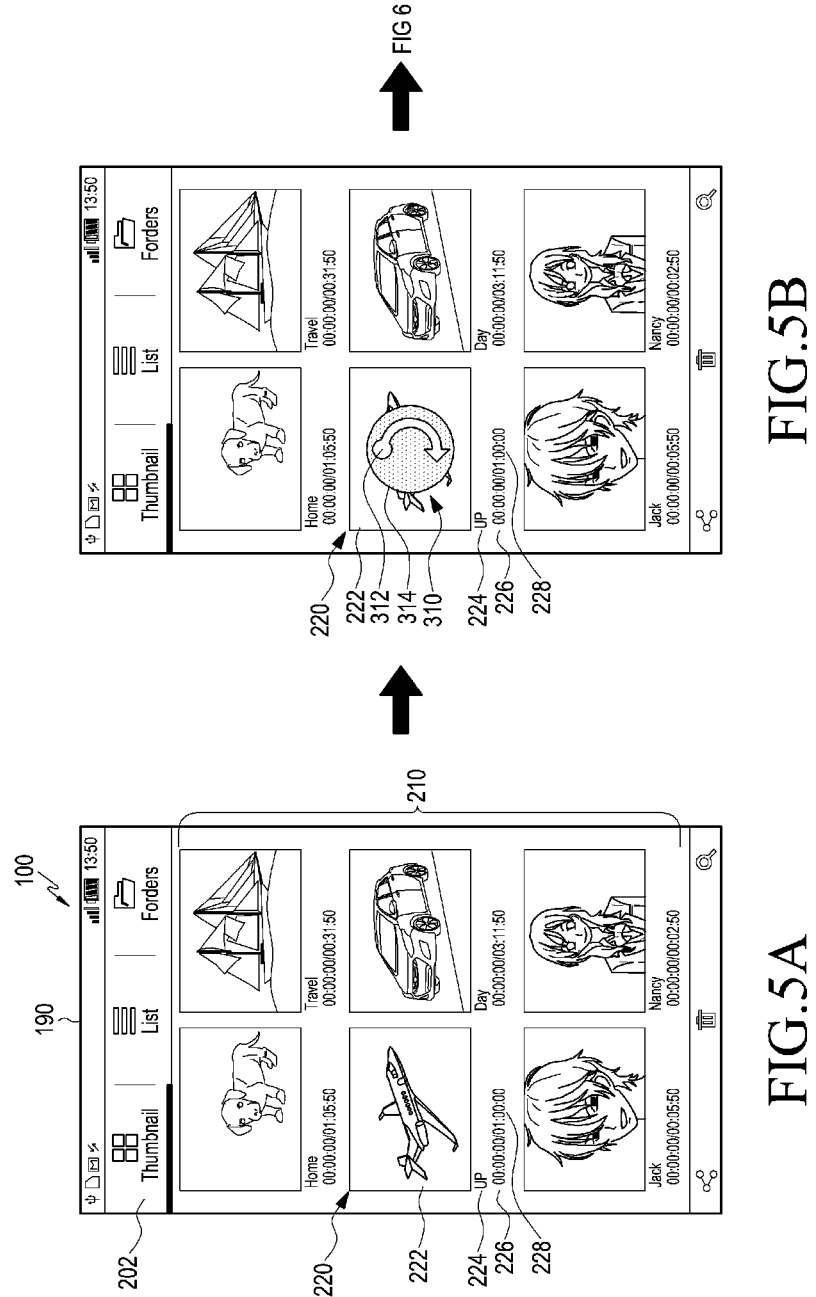

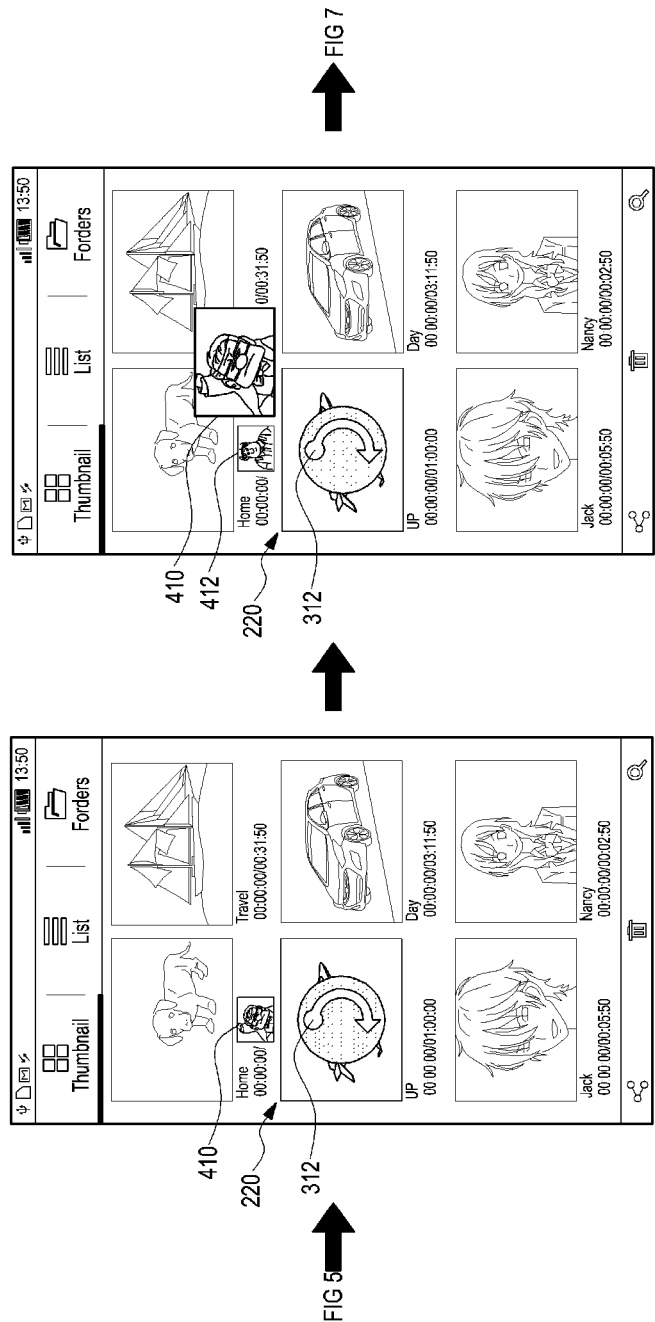

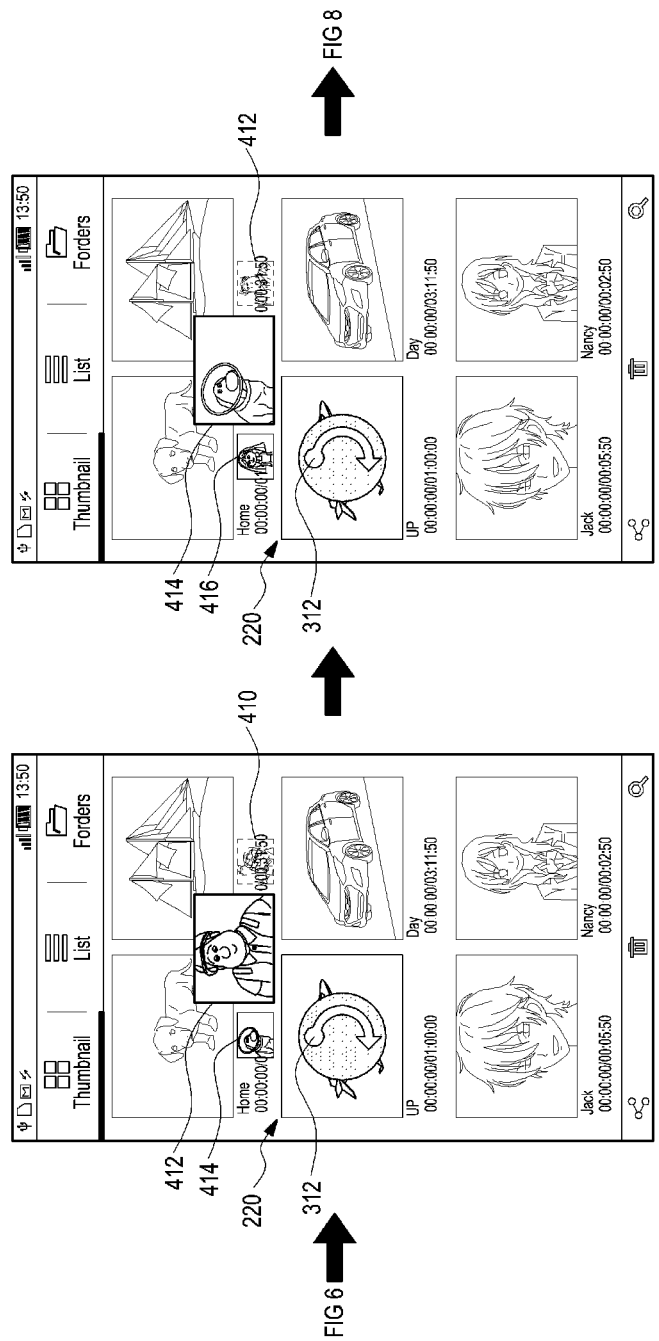

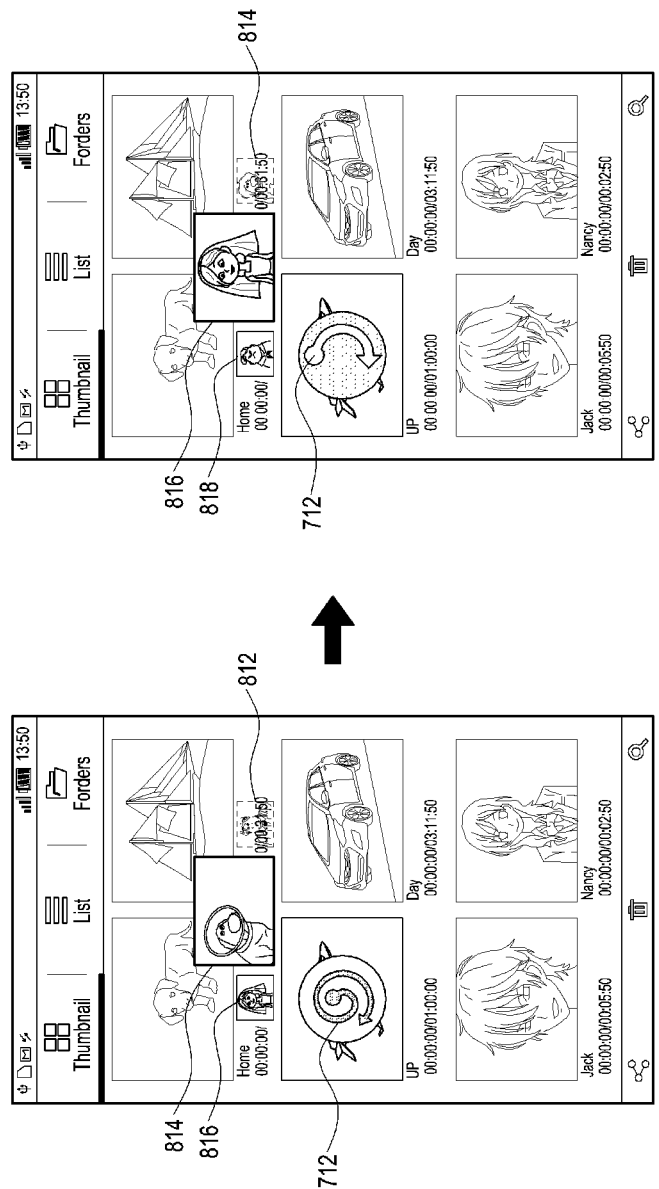

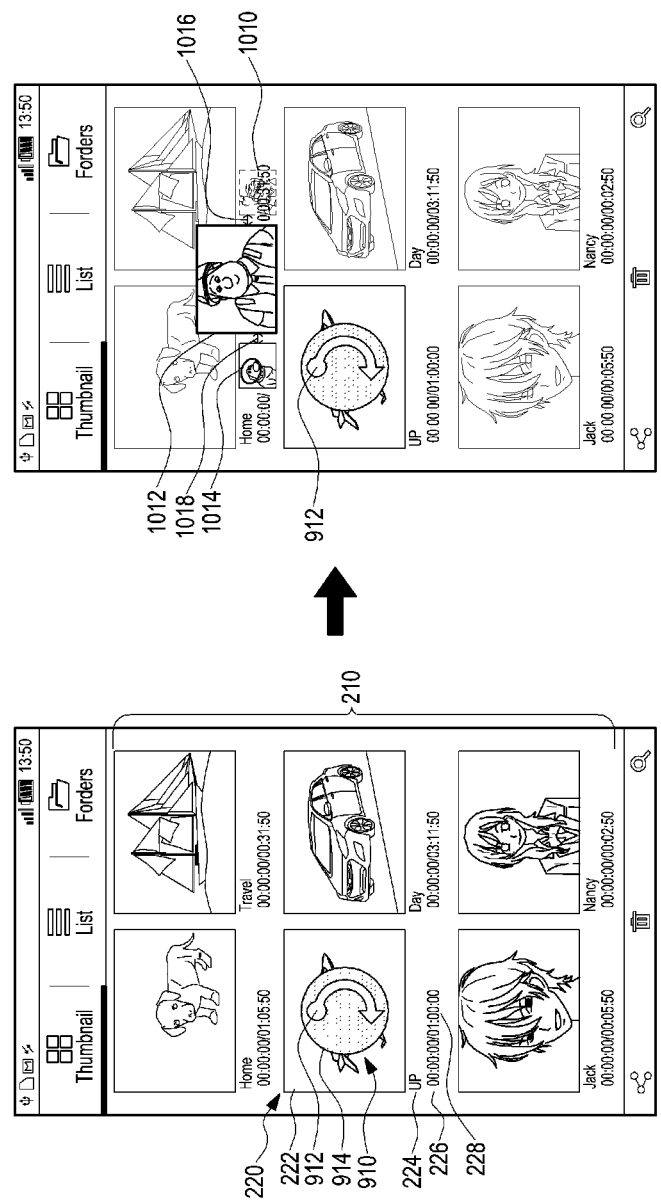

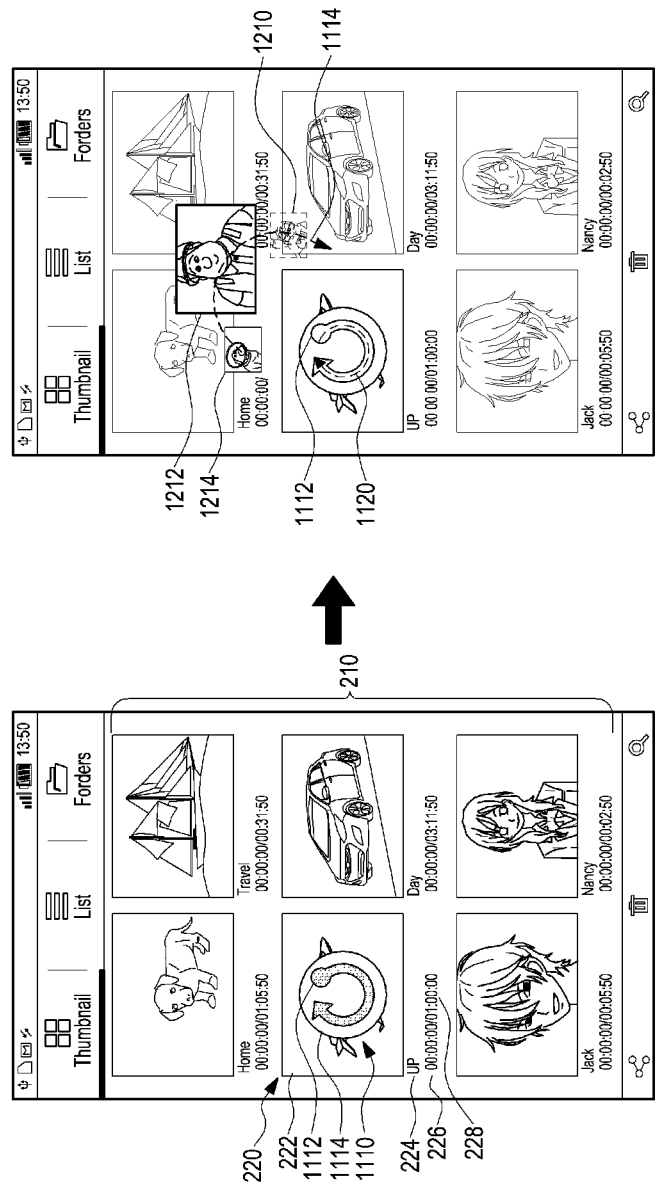

MOBILE APPARATUS PROVIDING PREVIEW BY DETECTING RUBBING GESTURE AND CONTROL METHOD THEREOF

PRIORITY

This application claims the benefit under 35 U.S.C. § 119(a) of a Korean patent application filed on Mar. 6, 2013 in the Korean Intellectual Property Office and assigned Serial No. 10-2013-0023872, the entire disclosure of which is hereby incorporated by reference.

BACKGROUND OF THE INVENTION

1. Field of the Invention

The present invention relates to a mobile apparatus and a control method thereof. For example, the present invention relates to a mobile apparatus and a control method thereof that provide a preview by detecting a rubbing gesture.

2. Description of the Related Art

Developed mobile apparatuses are now provided with a touch screen so that a user may more easily control the mobile apparatus merely by touching the touch screen. Using the touch screen, various objects may be displayed on such the mobile apparatus and the mobile apparatus may be controlled by detecting a selection on the displayed objects.

Among the objects, video contents may be displayed. To preview the video contents, a video file should be selected first. At this time, the user should perform a touch. The performed touch may also be referred to as a step. Thereafter, when the video file is selected, the video file may be reproduced. Also, an adjustment unit configured to adjust the reproducing time of the video file may be displayed. At this time, the user touches the adjustment unit configured to adjust the reproducing time so as to view the preview. At this time, the user should perform a touch again.

As described above, the user may view the preview of the video file only after performing two or more touches or steps. With this implementation, there is an inconvenience in that several touches are required in order to use the preview function in the mobile device. Accordingly, there is a need for a technology that is capable of providing a preview service of a video file using a minimum number of touches or steps when using the preview service of the video file implemented in the mobile apparatus.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a mobile apparatus and a control method thereof that provide a preview of video contents by detecting a rubbing gesture in which the preview of video contents is displayed according to the rubbing gesture detected on a thumb-nail of the video contents.

Another aspect of the present invention is to provide a mobile apparatus and a control method thereof that display the preview of video contents according to a time sequence of the video contents based on the rubbing gesture detected on the thumb-nail of the video contents in such a manner that the preview appears while becoming gradually larger and disappears while becoming gradually smaller.

Another aspect of the present invention is to provide a mobile apparatus and a control method thereof that display the preview of video contents on the touch screen when the rubbing gesture is detected, stop displaying the preview on the touch screen when an interruption of the rubbing gesture is detected, and display the preview on the touch screen again when the rubbing gesture is detected again.

Still another aspect of the present invention is to provide a mobile apparatus and a control method thereof that adjust a time interval of preview images of the video contents to correspond to the speed of the rubbing gesture so as to display the preview on the touch screen.

Still another aspect of the present invention is to provide a mobile apparatus and a control method thereof that adjust a positional spacing of preview images of the video contents to correspond to the speed of the rubbing gesture so as to display the preview.

Yet another aspect of the present invention is to provide a mobile apparatus and a control method thereof that arrange, in response to a consistent direction of the rubbing gesture, the positions of preview images of video contents in a direction which is the same as the consistent direction of the rubbing gesture so as to display the positions on the touch screen.

In accordance with an aspect of the present invention, a mobile apparatus control method that provides a preview by detecting a gesture is provided. The mobile apparatus control method includes displaying a thumb-nail of video contents on a touch screen, detecting a rubbing gesture on the thumb-nail of the video contents, and displaying a preview of the video contents on the touch screen.

In accordance with another aspect of the present invention, a mobile apparatus that provides a preview by detecting a rubbing gesture is provided. The mobile apparatus includes a touch screen configured to display a thumb-nail of video contents, and a controller configured to detect a rubbing gesture on the thumb-nail of the video contents, and to display a preview of the video contents on the touch screen.

In accordance with an aspect of the present invention, there is an advantage in that the preview of video contents may be displayed according to the rubbing gesture detected on a thumb-nail of the video contents.

In accordance with another aspect of the present invention, there is an advantage in that the preview of video contents may be displayed according to the rubbing gesture detected on the thumb-nail of the video contents in such a manner that preview images appear while becoming gradually larger and disappear while becoming gradually smaller according to the time sequence of the video contents.

In accordance with another aspect of the present invention, there is an advantage in that, when the rubbing gesture is detected, the preview of video contents may be displayed on the touch screen, when the interruption for the rubbing gesture is detected, displaying the preview on the touch screen may be stopped, and when the rubbing gesture is detected again, the preview may be displayed on the touch screen again.

In accordance with another aspect of the present invention, there is an advantage in that the preview may be displayed on the touch screen in such a manner that a time interval of preview images of the video contents may be adjusted to correspond to the speed of the rubbing gesture.

In accordance with another aspect of the present invention, there is an advantage in that the preview may be displayed in such a manner that, when the speed of the rubbing gesture becomes slower, the time interval of the preview images of the video contents is reduced, and when the speed of the rubbing gesture becomes faster, the time interval of the preview images of the video contents is increased.

In accordance with another aspect of the present invention, there is an advantage in that the preview may be displayed in such a manner that a positional spacing of preview images of the video contents may be adjusted to correspond to the speed of the rubbing gesture.

In accordance with another aspect of the present invention, there is an advantage in that the preview may be displayed in such a manner that, when the speed of the rubbing gesture becomes slower, the positional spacing of the preview images of the video contents may be reduced, and when the speed of the rubbing gesture becomes faster, the positional spacing of the preview images of the video contents may be increased, thereby allowing the user to recognize the speed of the rubbing gesture.

In accordance with another aspect of the present invention, there is an advantage in that the preview may be displayed in such a manner that, in response to a consistent direction of the rubbing gesture, the positions of the preview images of the video contents may be arranged in a direction which is the same as the consistent direction of the rubbing gesture.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A and 5B, 6A and 6B, 7A and 7B, 8A and 8B, and 9 illustrate scenes according to the mobile apparatus control method that provides a preview by detecting a rubbing gesture according to an exemplary embodiment of the present invention;

FIGS. 14A and 14B, and 15A and 15B illustrate scenes according to a mobile apparatus control method that provides a preview by detecting a rubbing gesture according to an exemplary embodiment of the present invention;

FIGS. 16A and 16B, and 17A and 17B illustrate scenes according to a mobile apparatus control method that provides a preview by detecting a rubbing gesture according to an exemplary embodiment of the present invention; and FIGS. 18A and 18B illustrate scenes according to a mobile apparatus control method that provides a preview by detecting a rubbing gesture according to an exemplary embodiment of the present invention.

Throughout the drawings, it should be noted that like reference numbers are used to depict the same or similar elements, features, and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
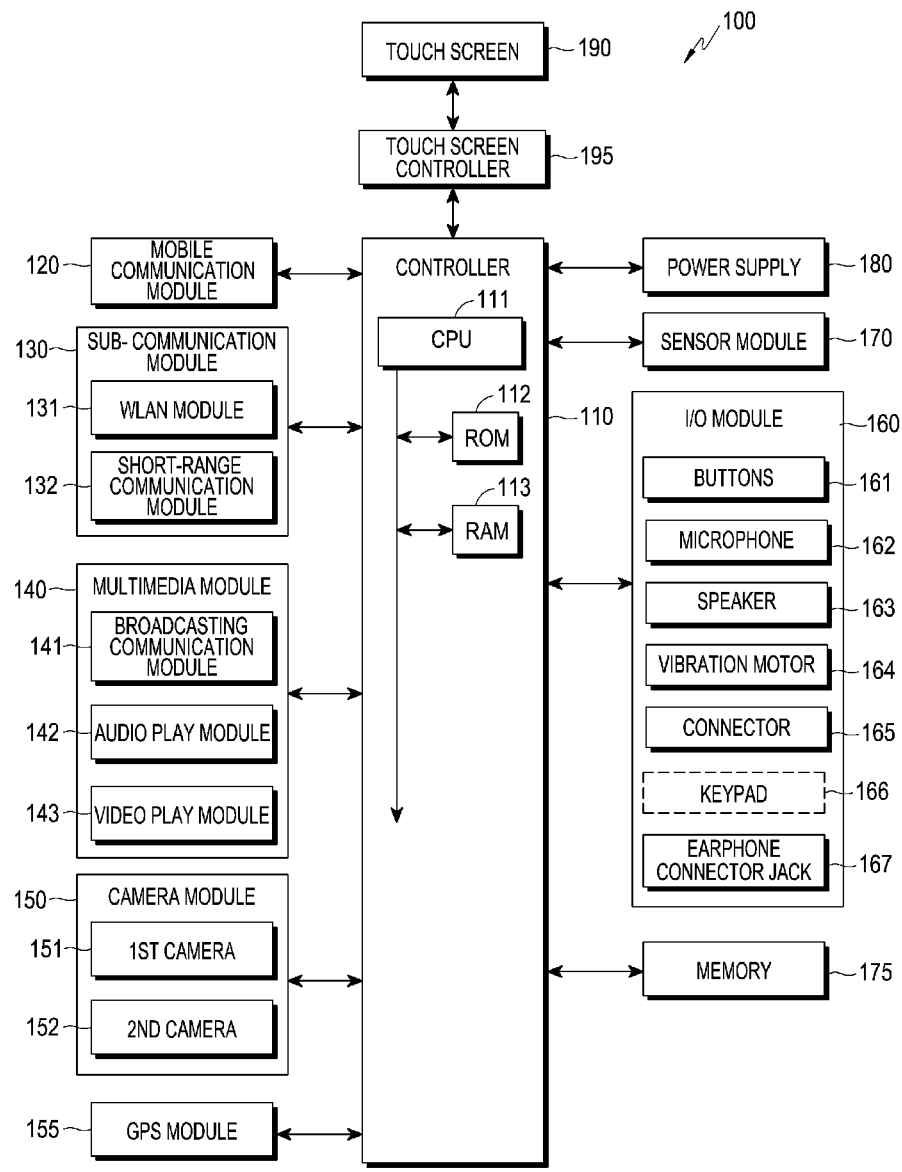
FIG. 1 is a schematic block diagram illustrating a mobile apparatus according to an exemplary embodiment of the present invention.

FIG. 1 is a schematic block diagram illustrating a mobile apparatus according to an exemplary embodiment of the present invention.

Referring to FIG. 1, the mobile apparatus 100 may be connected with an external apparatus (not illustrated) using an external apparatus connecting unit such as a sub-communication module 130, a connector 165 and an earphone connecting jack 167. The "external apparatus" may include various apparatuses such as an earphone, an external speaker, a Universal Serial Bus (USB) memory, a charger, a cradle, a docking station, a DMB antenna device, a mobile payment related apparatus, a health care apparatus (a blood sugar tester), a game machine, a vehicle navigation system, and the like that may be detached from and wiredly connected to the mobile apparatus 100. In addition, the "external apparatus" may include a local area communication apparatus such as a Bluetooth communication apparatus and a Near Field Communication (NFC) apparatus, a WiFi-direct communication apparatus, a wireless Access Point (AP), and the like that may be wirelessly connected to the mobile apparatus 100 through local area communication. Further, the external apparatus may include other apparatuses such as a portable phone, a smart phone, a tablet PC, a desktop PC, a server, and the like.

Referring to FIG. 1, the mobile apparatus 100 may include a display unit 190 and a display controller 195. In addition, the mobile apparatus 100 may include a controller 110, a mobile communication module 120, the sub-communication module 130, a multimedia module 140, a camera module 150, a Global Positioning System (GPS) module 155, an input/output module 160, a sensor module 170, a storage unit (i.e., memory) 175, and a power supply unit 180. The sub-communication module 130 may include at least one of a wireless LAN module 131 and a local area communication module 132, and the multimedia module 140 may include at least one of a broadcasting communication module 141, an audio reproducing module 142, and a moving image reproducing module 143. The camera module 150 may include at least one of a first camera 151 and a second camera 152, and the input/output module 160 may include at least one of a button 161, a microphone 162, a speaker 163, a vibration motor 164, the connector 165, a keypad 166, and the earphone connecting jack 167. Hereinbelow, descriptions will be made as to a case where the display unit 190 and the display controller 195 are a touch screen and a touch screen controller, respectively, by way of an example.

The controller 110 may include a CPU 111, a ROM 112 in which control programs for controlling the mobile apparatus 100 are stored, and a RAM 113 which stores signals or data input from the outside of the mobile apparatus 100 or is used as a memory region for an operation performed in the mobile apparatus 100. The CPU 111 may include a single core, a dual core, a triple core, or a quad core. The CPU 111, the 112 and the RAM 113 may be connected with each other through internal buses.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 may allow the mobile apparatus 100 to be connected with an external apparatus through mobile communication using one or more antennas (not illustrated) according to the control of the controller 110. The mobile communication module 120 may transmit/receive a wireless signal for voice communication, image communication, text messaging (e.g., Short Message Service (SMS)), or multimedia messaging (e.g., Multimedia Messaging Service (MMS)) to/from a portable phone (not illustrated) of which the phone number is input to the mobile apparatus 100, a smart phone (not illustrated), a tablet PC, or other apparatuses (not illustrated).

The sub-communication module 130 may include at least one of the wireless LAN module 131 and the local area communication module 132. For example, the sub-communication module 130 may include only the wireless LAN module 131, only the local area communication module 132, or both the wireless LAN module 131 and the local area communication module 132.

The wireless LAN module 131 may be connected to the Internet according to the control of the controller 110 in a place where a wireless AP (not illustrated) is installed. The wireless LAN module 131 supports the wireless LAN standard, IEEE802.11x, of the Institute of Electrical and Electronic Engineers (IEEE). The local area communication module 132 may perform local area communication wirelessly between the mobile apparatus 100 and an image forming apparatus (not illustrated) according to the control of the controller 110. The local area communication method may include, for example, Bluetooth, Infrared Data Association (IrDA) communication, WiFi-direct communication, NFC, and the like.

According to the performance of the mobile apparatus 100, the mobile apparatus 100 may include at least one of the mobile communication module 120, the wireless LAN module 131, and the local area communication module 132. For example, according to the performance, the mobile apparatus 100 may include a combination of the mobile communication module 120, the wireless LAN module 131, and the local area communication module 132.

The multimedia module 140 may include the broadcasting communication module 141, the audio reproducing module 142, or the moving image reproducing module 143. The broadcasting communication module 141 may receive a broadcasting signal (e.g., a TV broadcasting signal, a radio broadcasting signal or a data broadcasting signal) which is transmitted from a broadcasting station or broadcasting added information (e.g., Electric Program Guide (EPG) or (Electric Service Guide (ESG)) through a broadcasting communication antenna (not illustrated) according to the control of the controller 110. The audio reproducing module 142 may reproduce a stored or received digital audio file (e.g., a file of which the file extension is mp3, wma, ogg, or way) according to the control of the controller 110. The moving image reproducing module 143 may reproduce a stored or received digital moving image file (e.g., a file of which the file extension is mpeg, mpg, mp4, avi, mov, or mkv) according to the control of the controller 110. The moving image reproducing module 143 may reproduce a digital audio file.

The multimedia module 140 may include an audio reproducing module 142 and a moving image reproducing module 143 in addition to the broadcasting communication module 141. Also, the audio reproducing module 142 or the moving image reproducing module 143 of the multimedia module 140 may be included in the controller 110.

The camera module 150 may include at least one of the first camera 151 and the second camera 152 each of which photographs a still image or a moving image according to the control of the controller 110. In addition, the first camera 151 or the second camera 152 may include an auxiliary light source (e.g. a flash (not illustrated)) that provides an amount of light required for photographing. The first camera 151 may be disposed on the front surface of the mobile apparatus 100 and the second camera 152 may be disposed on the rear surface of the mobile apparatus 100. Alternatively, the first camera 151 and the second camera 152 may be positioned adjacent to each other (e.g., at a distance of 1 cm to 8 cm between the first camera 151 and the second camera 152) to be capable of photographing a three dimensional still image or a three dimensional moving image.

The GPS module 155 may receive radio waves from a plurality of Earth-orbiting GPS satellites (not illustrated), and may calculate the distance of the apparatus using the time of arrival of the radio waves to the mobile apparatus 100 from the GPS satellites.

The input/output module 160 may include one of a plurality of buttons 161, a microphone 162, a speaker 163, a vibration motor 164, a connector 165, and a keypad 166.

The buttons 161 may be formed on the front surface, side surfaces or rear surface of the housing of the mobile apparatus 100 and may include at least one of a power/lock button, a volume button, a menu button, a home button, a back button, a search button, and the like.

The microphone 162 may receive an input of voice or sound to produce an electrical signal according to the control of the controller 110.

The speaker 163 may output sounds which respectively correspond to various signals of the mobile communication module 120, the sub-communication module 130, the multimedia module 140, and the camera module 150 (e.g., a radio signal, a broadcasting signal, a digital audio file, a digital moving image file, photographing or the like) to the outside of the mobile apparatus 100 according to the control of the controller 110. The speaker 163 may output a sound which corresponds to the functions performed by the mobile apparatus 100 (for example, a button operation sound corresponding to a phone call or a call connection sound). One or a plurality of speakers 163 may be formed at a proper position or positions of the housing of the mobile apparatus 100.

The vibration motor 164 may convert an electronic signal to a mechanical signal according to the control of the controller 110. For example, when the mobile apparatus 100 set to a vibration mode receives a voice call from any other apparatus (not illustrated), the vibration motor 164 is operated. One or a plurality of vibration motors 164 may be provided in the housing of the mobile apparatus 100. The vibration motor 164 may be operated in response to a user's touch action that touches the touch screen 190 and a continuous movement of the touch on the touch screen 190.

The connector 165 may be used as an interface which interconnects the mobile apparatus 100 and an external apparatus (not illustrated) or a power source (not illustrated). The mobile apparatus 100 may transmit data stored in the storage unit 175 of the mobile apparatus 100 to the external apparatus (not illustrated) or receive data from an external apparatus (not illustrated) through a wired cable connected to the connector 165 according to the control of the controller 110. At this time, the external apparatus may be a docking station, and the data may be an input signal transferred from an external input device, for example, a mouse and a keyboard. In addition, the mobile apparatus 100 may receive power from the power source (not illustrated) through the wired cable connected to the connector 165 or charge a battery (not illustrated) using the power source.

The keypad 166 may receive a key input from the user so as to control the mobile apparatus 100. The keypad 166 may include a physical keypad (not illustrated) formed on the mobile apparatus 100 or a virtual keypad (not illustrated) displayed on the touch screen 190. The physical keypad (not illustrated) formed on the mobile apparatus 100 may be omitted according to the performance or configuration of the mobile apparatus 100.

An earphone (not illustrated) may be inserted into the earphone connecting jack 167 to be connected to the mobile apparatus 100.

The sensor module 170 may include at least one sensor that detects the status of the mobile apparatus 100. For example, the sensor module 170 may include a proximity sensor that detects whether the user approaches to the mobile apparatus 100 and an illumination sensor that detects the amount of light around the mobile apparatus 100. Also, the sensor module 170 may include a gyro sensor. The gyro sensor may detect the operation of the mobile apparatus 100 (e.g., rotation of the mobile apparatus 100, or acceleration or vibration applied to the mobile apparatus 100), may detect a point of the compass using the magnetic field on Earth, or may detect a gravity acting direction. Further, the sensor module 170 may include an altimeter that measures the atmospheric pressure to detect an altitude, and the sensor module 170 may produce a signal corresponding to the detection and transmit the signal to the controller 110. The sensors of the sensor module 170 may be added or omitted according to the performance of the mobile apparatus 100.

The storage unit 175 may store signals or data input/output in response to the operations of the mobile communication module 120, the sub-communication module 130, the multimedia module 140, the camera module 150, the GPS module 155, the input/output module 160, the sensor module 170, and the touch screen 190 according to the control of the controller 110. The storage unit 175 may store control programs and applications for controlling the mobile apparatus 100 or the controller 110.

The term, "storage unit" may include the storage unit 175, the ROM 112 and the RAM 113 in the controller 110, or a memory card (not illustrated) (e.g., an SD card or a memory stick) mounted in the mobile apparatus 100. The storage unit may include a non-volatile memory, a volatile memory, a Hard Disc Drive (HDD) or a Solid State Drive (SSD).

The power supply unit 180 may supply power to one or more batteries (not illustrated) provided in the housing of the mobile apparatus 100 according to the control of the controller 110. The one or more batteries (not illustrated) supply power to the mobile apparatus 100. In addition, the power supply unit 180 may supply power input from an external power source (not illustrated) through a wired cable connected to the connector 165 to the mobile apparatus 100. Further, the power supply unit 180 may supply power input wirelessly from the external power source through a wireless charging technology to the mobile apparatus 100.

The touch screen 190 may provide a plurality of user interfaces that correspond to various services (e.g., phone call, data transmission, broadcasting and photographing), respectively, to the user. The touch screen 190 may transmit an analog signal corresponding to at least one touch input to the user interfaces to the touch screen controller 195. The touch screen 190 may receive an input through the user's body (e.g., fingers including a thumb) or a touchable input means (e.g., a stylus pen). In addition, the touch screen 190 may receive an input of a continuous movement of a touch among one or more touches. The touch screen 190 may transmit an analog signal corresponding to the continuous movement of a touch input thereto to the touch screen controller 195.

In exemplary embodiments of the present invention, the touch is not limited to a contact between the touch screen 190 and the user's body or a touchable input means and includes a contactless touch. The space capable of being detected by the touch screen 190 may be changed according to the performance or configuration of the mobile apparatus 100.

The touch screen 190 may be implemented, for example, in a resistive type, a capacitive type, an infrared type, or an acoustic wave type.

The touch screen controller 195 may convert an analog signal received from the touch screen 190 into a digital signal (e.g., an X and Y coordinate) and transmits the digital signal to the controller 110. The controller 110 may control the touch screen 190 using the digital signal received from the touch screen controller 195. For example, the controller 110 may cause a shortcut icon (not illustrated) displayed on the touch screen 190 to be selected or may execute the shortcut icon (not illustrated) in response to a touch. In addition, the touch screen controller 195 may be included in the controller 110.

Figure 2:
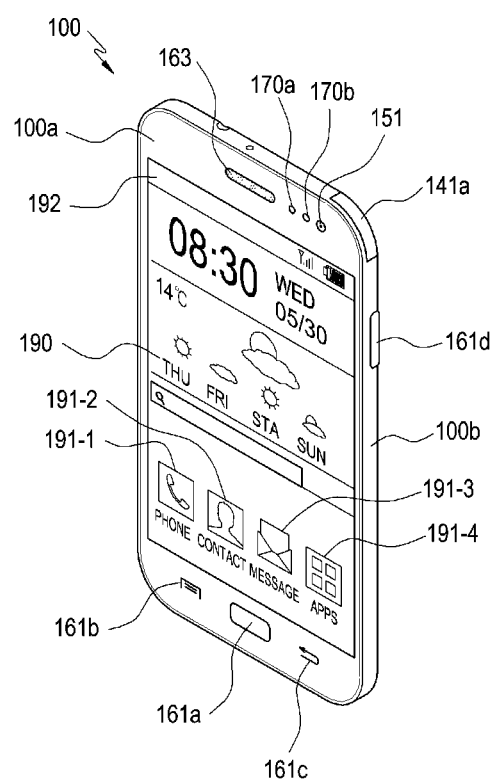
FIG. 2 is a front side perspective view of a mobile apparatus according to an exemplary embodiment of the present invention.
Figure 3:
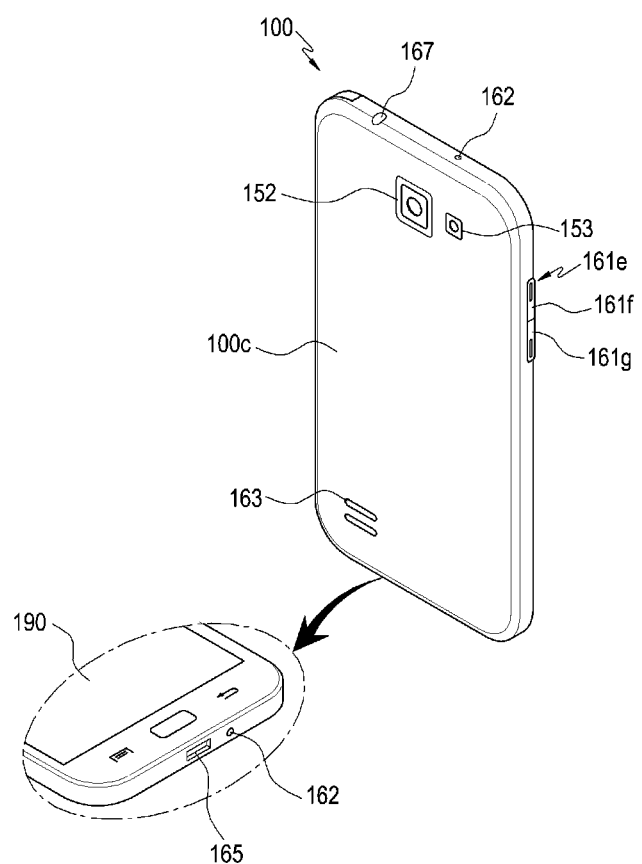
FIG. 3 is a rear side perspective view of a mobile apparatus according to an exemplary embodiment of the present invention.

FIG. 2 is a front side perspective view of a mobile apparatus according to an exemplary embodiment of the present invention and FIG. 3 is a rear side perspective view of a mobile apparatus according to an exemplary embodiment of the present invention.

Referring to FIGS. 2 and 3, a touch screen 190 is arranged at the center of the front surface 100a of the mobile apparatus 100. The touch screen 190 is formed in a large size so that the touch screen 190 occupies almost all the front surface 100a of the mobile apparatus 100. In FIG. 2, an example in which a main home screen is displayed on the touch screen 190 is illustrated. The main home screen is the first screen displayed on the touch screen 190 when the mobile apparatus 100 is turned ON. When the mobile apparatus 100 may include a plurality of pages of different home screens, the main home screen may be the first home screen among the plurality of pages of home screens. Shortcut icons 191-1, 191-2, and 191-3 that execute frequently used applications, an application switch key 191-4, and the current time, weather, etc. may be displayed on the home screen. The application switch key 191-4 displays application icons that indicate applications on the touch screen 190, on a screen. At the top end of the touch screen 190, a status bar 192 may be formed that indicates the status of the mobile apparatus 100 such as the battery charge status, the intensity of a received signal and current time.

A home button 161a, a menu button 161b, and a back button 161c may be formed at the lower part of the touch screen 190.

The home button 161a displays the main home screen on the touch screen 190. For example, when the home button 161a is pressed (or touched) in a state where any home screen different from the main home screen or a menu screen is displayed on the touch screen 190, the main home screen may be displayed on the touch screen 190. In addition, when the home button 161a may be pressed (or touched) while an application is being executed on the touch screen 190, the main home screen illustrated in FIG. 2 may be displayed on the touch screen 190. In addition, the home button 161a may be used to cause the recently used applications on the touch screen 190 to be displayed or to display a task manager.

The menu button 161b may provide connection menus that may be used on the touch screen 190. The connection menus may include a widget addition menu, a background screen menu, a search menu, an editing menu, an environment setting menu, etc. In addition, when an application is executed, the menu button 161b may provide a connection menu connected to the application.

The back button 161c may cause a screen executed just prior to the currently executed screen to be displayed or may end the most recently used application.

At an edge of the front surface 100a of the mobile apparatus 100, a first camera 151, an illumination sensor 170a, and a proximity sensor 170b may be arranged. On the rear surface 100c of the mobile apparatus 100, a second camera 152, a flash 153, and a speaker 163 may be arranged.

On the side surfaces 100b of the mobile apparatus 100, for example, a power/reset button 161d, a volume button 161e including an up volume control 161f and a down volume control 161g, a terrestrial DMB antenna 141a that receives broadcasting, and one or more microphones 162 may be arranged. The DMB antenna 141a may be formed to be fixedly or detachably mounted on the mobile apparatus 100.

A connector 165 is formed on the bottom side surface of the mobile apparatus 100. The connector 165 is formed with a plurality of electrodes to be wiredly connected to an external apparatus. On the top side surface of the mobile apparatus 100, an earphone connecting jack 167 may be formed. An earphone may be inserted into the earphone connecting jack 167.

Figure 4:
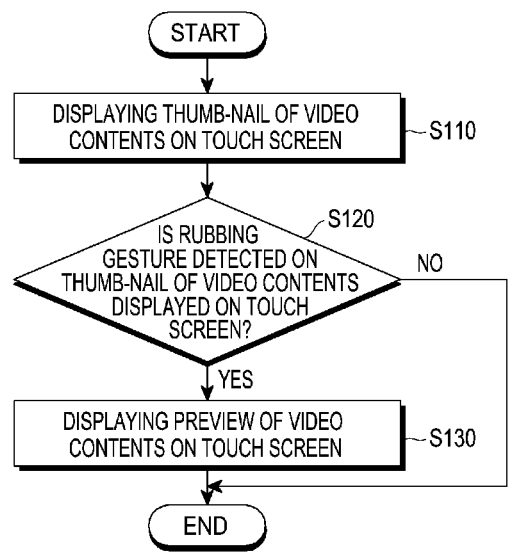
FIG. 4 is a flowchart illustrating a mobile apparatus control method that provides a preview by detecting a rubbing gesture according to an exemplary embodiment of the present invention.

FIG. 4 is a flowchart illustrating a mobile apparatus control method that provides a preview by detecting a rubbing gesture according to an exemplary embodiment of the present invention. FIGS. 5A and 5B, 6A and 6B, 7A and 7B, 8A and 8B, and 9 illustrate scenes according to the mobile apparatus control method that provides a preview by detecting a rubbing gesture according to an exemplary embodiment of the present invention.

Referring to FIG. 4, the mobile apparatus control method that may provide a preview by detecting a rubbing gesture first displays a thumb-nail of video contents on a touch screen in step S110. The controller 110 of the mobile apparatus 100 may display the thumb-nail on the touch screen 190.

The video contents may include a plurality of images reproduced sequentially according to a time sequence. The plurality of images may be sequentially displayed to be reproduced on the touch screen 190 according to a time sequence. That is, the controller 110 may provide the video contents to a user by sequentially displaying the plurality of images on the touch screen 190 according to the time sequence.

In addition, the video contents may include information related to a plurality of images, a title and a reproducing time. At this time, the controller 110 may form a thumb-nail of the video contents by extracting important information from the information included in the video contents. Accordingly, the thumb-nail of the video contents includes important information related to the video contents. For example, the important information of the video contents may include the title, the reproducing time and the first image of the video contents. For example, the controller 110 may display the thumb-nail of the video contents including the title, the reproducing time and the first image of the video contents on the touch screen 190. Accordingly, when the thumb-nail of the video contents is provided, the user may grasp the entire content about the video contents by recognizing the important information of the video contents merely by viewing only the thumb-nail of the video contents.

Referring to FIG. 5A, the controller 110 may display the thumb-nail 210 of the video contents on the touch screen 190. At this time, the thumb-nail 210 of the video contents includes important information related to the video contents. For example, the important information related to the video contents may include the title, the reproducing time and the first image of the video contents. Accordingly, as illustrated in FIG. 5A, the controller 110 may display the thumb-nail of the video contents 220 that includes the title 224, the reproducing time in which the start time 226 and the end time 228 are included, and the first image 222 of the video contents on the touch screen 190. For example, as illustrated in FIG. 5A, the controller 110 may display at least one thumb-nail of the video contents 220 on the touch screen 190. In FIG. 5A, six thumb-nails of the video contents 220 are displayed. In addition, the title 224 of the video contents such as "Up", the reproducing time in which the start time 226 of the video contents 220 such as "00:00:00" and the end time 228 such as "01:00:00" of the video contents 220 are included, and the first image 222 of the video contents 220 such as an "airplane" may be included in the thumb-nail of the video contents 220 of FIG. 5A, and displayed on the touch screen 190. At this time, as illustrated in FIG. 5A, at least one tab 202 may be displayed on the touch screen 190. The at least one tab 202 may include a thumb-nail tab, a list tab and a folder tab. At this time, when the thumb-nail tab is selected (a touch is detected on the touch screen), the controller 110 may display a thumb-nail 210 of the video contents on the touch screen 190. In addition, when the list tab is selected (touched), the controller 110 may display a list of the video contents on the touch screen 190. In addition, when the folder tab is selected (touched), the controller 110 may display a folder of the video contents on the touch screen 190.

Next, a rubbing gesture on the touch screen where the thumb-nail of the video contents is displayed is detected in step S120. The controller 110 detects the rubbing gesture on the thumb-nail of the video contents displayed on the touch screen. For example, as in FIG. 5B, the controller 110 may detect a rubbing gesture 310 on the thumb-nail of the video contents 220 displayed on the touch screen 190.

At this time, the rubbing gesture may be a continuous touch in a pre-set region on the touch screen. For example, as in FIG. 5B, the rubbing gesture may be a continuous touch 312 of, for example, a circular form in the pre-set region 314. Here, the continuous touch means a touch that is not ended after the detection of the touch input has been started. That is, in the user's position, the continuous touch means that the user continuously touches the touch screen without taking a finger off the touch screen after the user has started the touch on the screen by the finger. Accordingly, the rubbing gesture may mean a touch in which a touch input is not ended after the touch input has been started in a pre-set region on the touch screen.

In addition, the rubbing gesture may be a continuous touch rotating in the pre-set region on the touch screen. For example, as in FIG. 5B, the rubbing gesture may be a continuous touch 312 of, for example, a circular form rotating clockwise in a pre-set region 314. At this time, although the rubbing gesture may be the continuous touch rotating clockwise in FIG. 5B, the rubbing gesture may be a continuous touch rotating counterclockwise. As described above, the continuous touch means a touch in which the touch input is not ended after the detection of the touch input has been started. Accordingly, the rubbing gesture may mean a touch in which the touch input is not ended after the touch input rotating in the pre-set region on the touch screen has been started.

At this time, when the rubbing gesture is detected on the thumb-nail of the video contents displayed on the touch screen, the process proceeds to step S130. However, when the rubbing gesture is not detected, the process is ended.

When the rubbing gesture is detected, the preview of the video contents is displayed on the touch screen in step S130. When the rubbing gesture is detected, the controller 110 displays the preview of the video contents on the touch screen. As described above, the video contents may include a plurality of images which are sequentially reproduced according to the time sequence. At this time, the controller 110 may sort preview images among the plurality of images included in the video contents. In addition, the controller 110 may display the preview by sequentially displaying the preview images sorted among the plurality of images included in the video contents.

At this time, when sorting the preview images among the plurality of images, the controller 110 may sort the preview images at a pre-set time interval. The pre-set time interval may be a fixed time interval. For example, the fixed time interval may be 10 seconds. Accordingly, the controller 110 may sort the preview images among the plurality of images at a 10 second time interval.

Alternatively, the pre-set time interval may be predetermined time points in the entire reproducing time. For example, the predetermined time points may be a 1/4 point, a 2/4 point, a 3/4 point, and a 4/4 point in the predetermined reproducing time. Accordingly, the controller 110 may sort the plurality of images into an image at the a 1/4 point, an image at the 2/4 point, an image at the 3/4 point, and an image at the 4/4 point. That is, the preview images may include the image at the 1/4 point, the image at the 2/4 point, the image at the 3/4 point, the image at the 4/4 point.

Accordingly, the controller 110 may sequentially display the preview images sorted among the plurality of images included in the contents. For example, as illustrated in FIG. 6A, the controller 110 may display the preview of the video contents 220 in such a manner that the image 410 at the 1/4 point in the entire reproducing time may be first displayed. Next, as in FIG. 6B, the controller 110 may display the preview of the video contents 220 in such a manner that the image 412 at the 2/4 point which corresponds to the next image together with the image 410 at the 1/4 point in the entire reproducing time of the video contents 220 may be sequentially displayed. Next, as in FIG. 7A, the controller 110 may display the preview of the video contents 220 in such a manner that the image 414 at the 3/4 point which corresponds to the next image may be sequentially displayed together with the image 410 at the 1/4 point and the image 412 at the 2/4 point in the entire reproducing time of the video contents 220. Next, as in FIG. 7B, the controller 110 may display the preview of the video contents 220 in such a manner that the image 416 at the 4/4 point which corresponds to the next image may be sequentially displayed together with the image 410 at the 1/4 point, the image 412 at the 2/4 point and the image 414 at the 3/4 point in the entire reproducing time. Next, as in FIG. 8A, the controller 110 may display the preview of the video contents 220 in such a manner that the image 414 at the 3/4 point and the image 416 at the 4/4 point in the entire reproducing time may be displayed. Next, as in FIG. 8B, the controller 110 may display the preview of the video contents 220 in such a manner that the image 416 at the 4/4 point in the entire reproducing time may be displayed. Next, as in FIG. 9, the controller 110 may end the preview of the video contents 220.

According to the present exemplary embodiment, there is an advantage in that the preview of the video contents may be displayed according to a rubbing gesture detected on a thumb-nail of the video contents displayed on the touch screen.

In addition, the preview may be displayed at a pre-set position adjacent to the thumb-nail of the video contents. For example, the pre-set position may be the left side, the right side, the upper side or the lower side of the thumb-nail of the video contents. Accordingly, the controller 110 may display the preview in such a manner that the preview images sorted among the plurality of images included in the video contents may be displayed at the pre-set position. For example, as in FIGS. 6A to 7B, the pre-set position may be the upper side of the thumb-nail of the video contents. That is, the controller 110 may sort the preview images among the plurality of images included in the video contents at the upper side of the thumb-nail of the video contents as the preview. However, the preview may be displayed at any position. Accordingly, the controller 110 may display the preview at any position other than the pre-set position. That is, the controller 110 may display the preview images sorted among the plurality of images included in the video contents at any position as the preview.

In addition, the preview may appear and disappear according to the time sequence of the video contents. That is, the controller 110 may display the preview in such a manner that the preview images sorted among the plurality of images included in the video contents appear and disappear according to the time sequence.

In addition, the preview may be displayed in such a manner that, according to the time sequence of the video contents, the first preview image may appear while gradually becoming larger and disappear while becoming smaller and transparent, and at the same time, the second preview image of the time sequence next to the first preview image may appear while gradually becoming larger and disappear while becoming smaller and transparent.

For example, as in FIG. 6A, the controller 110 may first display the first preview image 410 of which the time sequence is the earliest in the entire reproducing time as the preview of the video contents 220. At this time, as in FIGS. 6A and 6B, when displaying the first preview image 410, the controller 110 may display the first preview image 410 in such a manner that the first preview image 410 is displayed in a size smaller than the video contents 220 and displayed to become gradually larger.

Next, as in FIGS. 6A and 6B, the controller 110 may display the preview of the video contents 220 in such a manner that the first preview image 410 may appear while becoming gradually larger according to the time sequence of the video, and at the same time, the second preview image 412 of the time sequence next to the first preview image 410 may appear.

Next, as in FIGS. 6B and 7A, the controller 110 may display the preview of the video contents 220 in such a manner that, simultaneously when the first preview image 410 disappears while becoming gradually smaller and transparent, the second preview image 412 may appear while becoming gradually larger, and the third preview image 414 of the time sequence next to the second preview image may appear.

Next, as in FIGS. 7A and 7B, the controller 110 may display the preview of the video contents 220 in such a manner that, simultaneously when the second preview image 412 disappears while becoming gradually smaller and transparent, the third preview image 414 may appear while becoming gradually larger, and the fourth preview image 416 of the time sequence next to the second preview image 414 may appear.

Figures 8A, 8B:
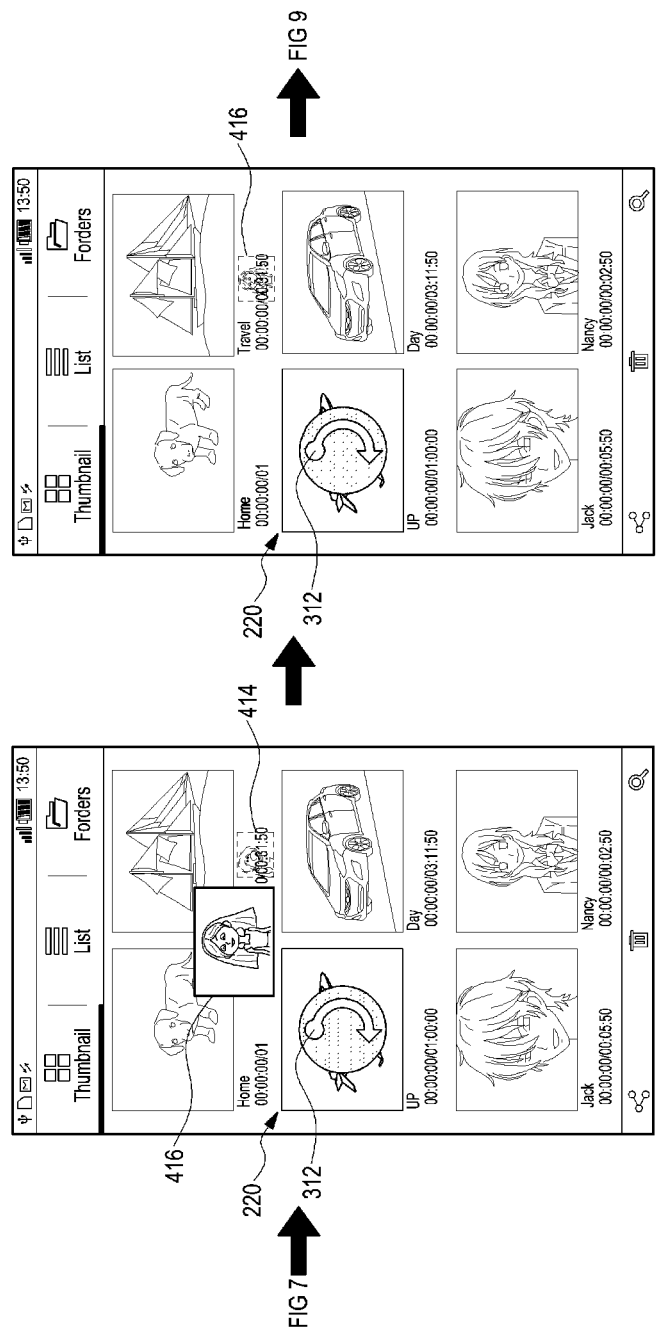

Next, as in FIGS. 7B and 8A, the controller 110 may display the preview of the video contents 220 in such a manner that, simultaneously when the third preview image 414 disappears while becoming gradually smaller and transparent, the fourth preview image 416 may appear while becoming gradually larger.

Next, as in FIGS. 8A and 8B, the controller 110 may display the preview of the video contents 220 in such a manner that the fourth preview image 416 may disappear while becoming gradually smaller and transparent.

Figure 9:
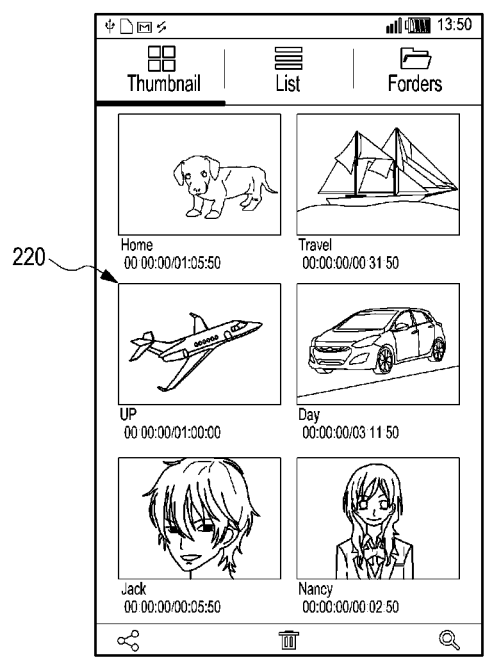

Next, as in FIG. 9, the controller 110 may end the preview of the video contents 220.

According to the present exemplary embodiment, there is an advantage in that, according to a rubbing gesture detected on a thumb-nail of video contents displayed on a touch screen, the preview of the video contents may be displayed in such a manner that a preview image may appear while becoming gradually larger and disappear while becoming smaller.

Figure 10:
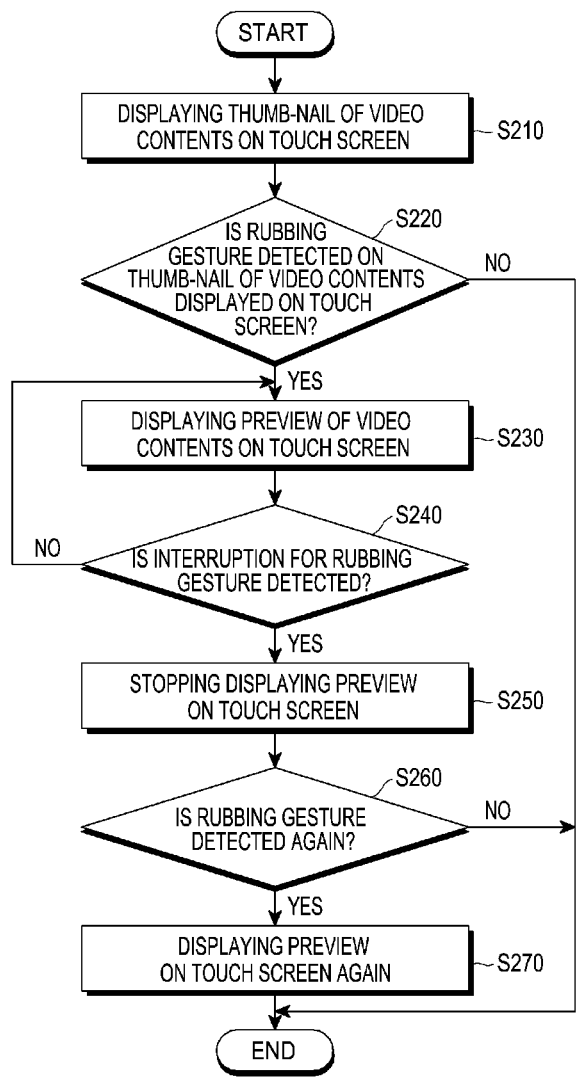
FIG. 10 is a flowchart illustrating a mobile apparatus control method that provides a preview by detecting a rubbing gesture according to an exemplary embodiment of the present invention.

FIG. 10 is a flowchart related to a mobile apparatus control method that provides a preview by detecting a rubbing gesture according to an exemplary embodiment of the present invention. FIGS. 11A and 11B, 12A and 12B, and 13A and 13B illustrate scenes according to the mobile apparatus control method by detecting a rubbing gesture according to an exemplary embodiment of the present invention.

Referring to FIG. 10, the mobile apparatus control method that provides a preview by detecting a rubbing gesture first displays a thumb-nail of video contents on a touch screen in step S210. The controller 110 of the mobile apparatus 100 may display the thumb-nail on the touch screen 190.

The video contents include a plurality of images reproduced sequentially according to a time sequence. The plurality of images may be sequentially displayed to be reproduced on the touch screen 190 according to the time sequence. That is, the controller 110 may provide the video contents to a user by sequentially displaying the plurality of images on the touch screen 190 according to the time sequence.

In addition, the video contents may include information related to a plurality of images, a title and reproducing time. At this time, the controller 110 may form a thumb-nail of the video contents by extracting important information from the information included in the video contents. Accordingly, the thumb-nail of the video contents may include important information related to the video contents. For example, the important information of the video contents may include the title, the reproducing time and the first image of the video contents. For example, the controller 110 may display the thumb-nail of the video contents including the title, the reproducing time and the first image of the video contents on the touch screen 190. Accordingly, when the thumb-nail of the video contents is provided, the user may grasp the entire content about the video contents by recognizing the important information of the video contents merely by viewing only the thumb-nail of the video contents.

Figures 11A, 11B:
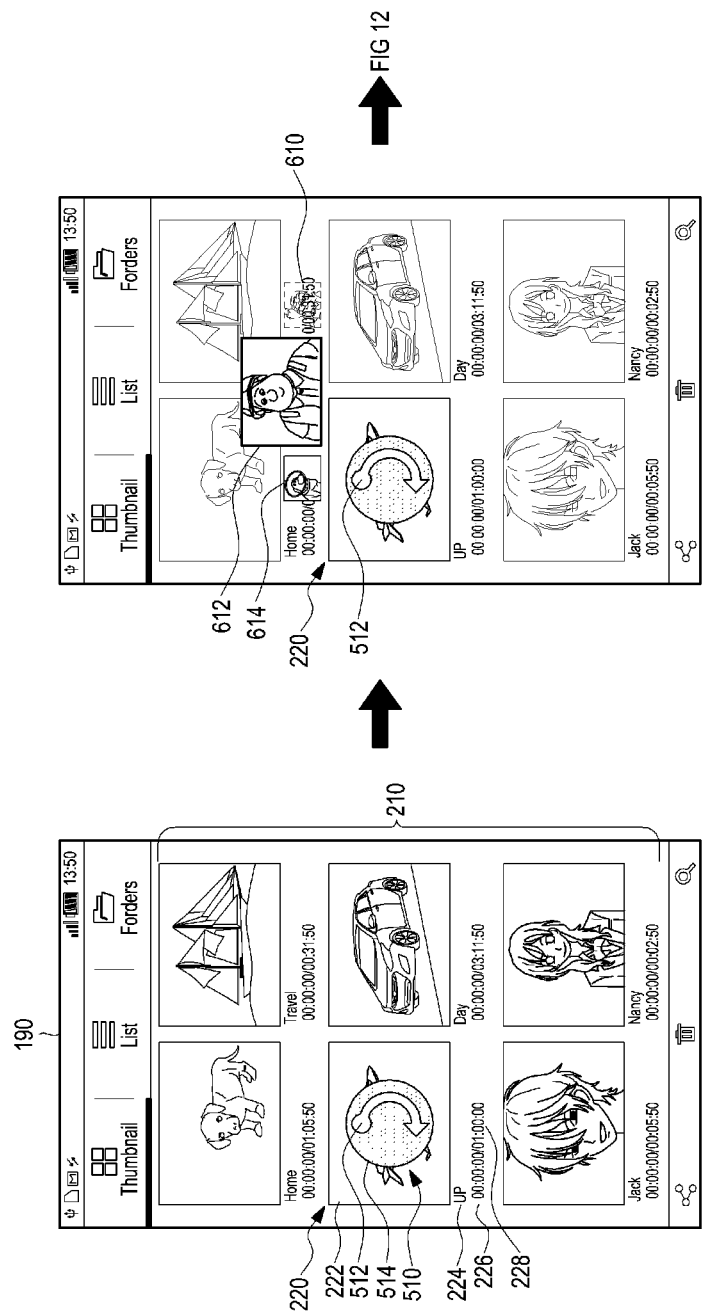
FIGS. 11A and 11B, 12A and 12B, and 13A and 13B illustrate scenes according to the mobile apparatus control method that provides a preview by detecting a rubbing gesture according to an exemplary embodiment of the present invention.

Referring to FIG. 11A, the controller 110 displays the thumb-nail 210 of the video contents on the touch screen 190. At this time, the thumb-nail 210 of the video contents may include important information related to the video contents. For example, the important information related to the video contents may include the title, the reproducing time and the first image of the video contents. Accordingly, as illustrated in FIG. 11A, the controller 110 may display the thumb-nail of the video contents 220 that includes the title 224, the reproducing time in which the start time 226 and the end time 228 are included, and the first image 222 of the video contents on the touch screen 190. For example, as illustrated in FIG. 11A, the controller 110 may display at least one thumb-nail of the video contents 220 on the touch screen 190. In FIG. 11A, six thumb-nails of the video contents 220 are displayed. In addition, the title 224 of the video contents such as "Up", the reproducing time in which the start time 226 of the video contents 220 such as "00:00:00" and the end time 228 such as "01:00:00" of the video contents 220 are included, and the first image 222 of the video contents 220 such as an "airplane" may be included in the thumb-nail of the video contents 220 of FIG. 11A, and displayed on the touch screen 190.

Next, a rubbing gesture on the touch screen where the thumb-nail of the video contents is displayed is detected in step S220. The controller 110 detects the rubbing gesture on the thumb-nail of the video contents displayed on the touch screen. For example, as in FIG. 11A, the controller 110 may detect a rubbing gesture 510 on the thumb-nail of the video contents 220 displayed on the touch screen 190.

At this time, the rubbing gesture may be a continuous touch in a pre-set region on the touch screen. For example, as in FIG. 11B, the rubbing gesture may be a continuous touch 512 of, for example, a circular form in the pre-set region 514. Here, the continuous touch means a touch that is not ended after the detection of the touch input has been started. That is, in the user's position, the continuous touch means that the user continuously touches the touch screen without taking a finger off the touch screen after the user has started the touch on the screen by the finger. Accordingly, the rubbing gesture may mean a touch in which a touch input is not ended after the touch input has been started in a pre-set region on the touch screen.

In addition, the rubbing gesture may be a continuous touch rotating in the pre-set region on the touch screen. For example, as in FIG. 11B, the rubbing gesture may be a continuous touch 512 of, for example, a circular form rotating clockwise in a pre-set region 514. At this time, although the rubbing gesture is the continuous touch rotating clockwise in FIG. 11B, the rubbing gesture may be a continuous touch rotating counterclockwise. As described above, the continuous touch means a touch in which the touch input is not ended after the detection of the touch input has been started. Accordingly, the rubbing gesture may mean a touch in which the touch input is not ended after the touch input rotating in the pre-set region on the touch screen has been started.

At this time, when the rubbing gesture is detected on the thumb-nail of the video contents displayed on the touch screen, the process proceeds to step S230. However, when the rubbing gesture is not detected, the process is ended.

Next, when the rubbing gesture is detected, the preview of the video contents is displayed on the touch screen in step S230. When the rubbing gesture is detected, the controller 110 displays the preview of the video contents on the touch screen. As described above, the video contents include a plurality of images which are sequentially reproduced according to the time sequence. At this time, the controller 110 may sort preview images among the plurality of images included in the video contents. In addition, the controller 110 may sequentially display the preview images sorted among the plurality of images included in the video contents as the preview.

At this time, when sorting the preview images among the plurality of images, the controller 110 may sort the preview images at a pre-set time interval. The pre-set time interval may be a fixed time interval. Alternatively, the pre-set time interval may be predetermined time points in the entire reproducing time.

Accordingly, the controller 110 may sequentially display the preview images sorted among the plurality of images included in the video contents. For example, as illustrated in FIG. 11B, the controller 110 may display the preview of the video contents 220 in the sequence of a first image 610, a second image 612 corresponding to the image next to the first image 610, and a third image 614 corresponding to the image next to the second image 612.

Figures 12A, 12B:
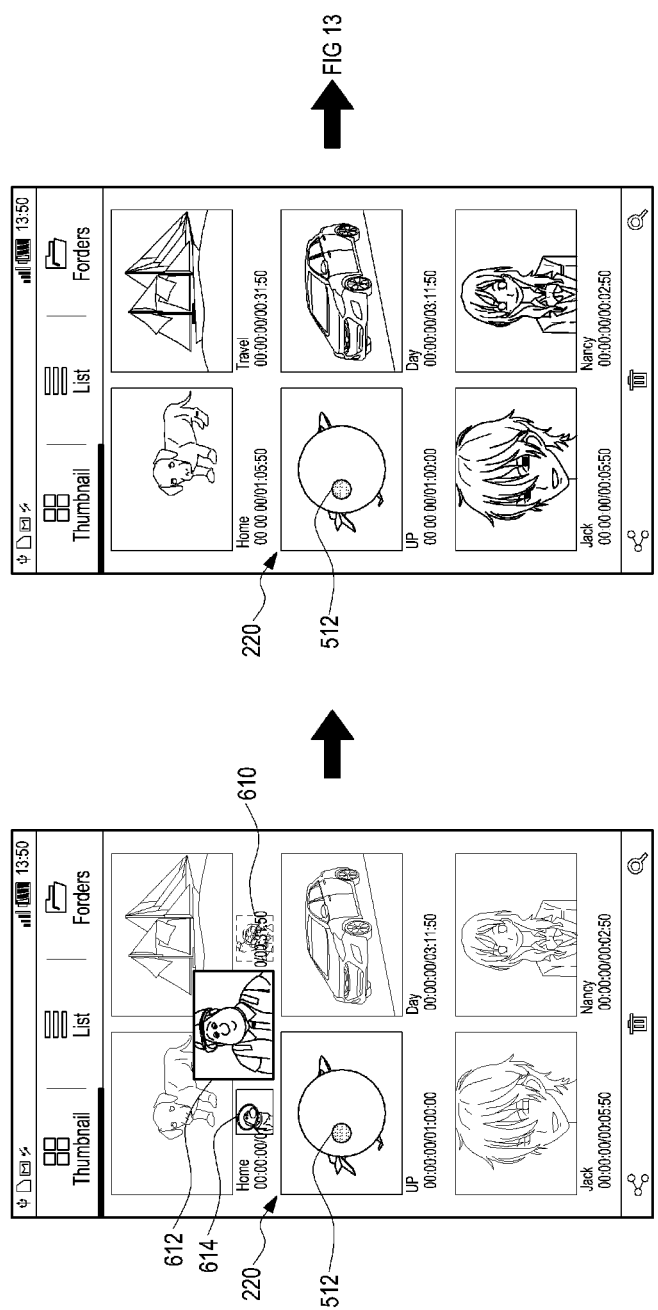

Next, it is confirmed whether interruption for the rubbing gesture is detected or not in step S240. The controller 110 confirms whether the interruption for the rubbing gesture is detected or not. The controller 110 may confirm on the touch screen 190 whether the interruption for the rubbing gesture corresponding to the continuous touch is detected in the pre-set region on the touch screen 190 or not. Here, the interruption for the rubbing gesture may mean that the touch input is ended after the touch input for the rubbing gesture has been detected. In the user's position, the interruption for the rubbing gesture may mean that a finger is taken off from the touch screen or the continuous touch of the rubbing gesture is interrupted after the touch for the rubbing gesture has been started. That is, the interruption for the rubbing gesture may mean that the continuous touch is removed or stopped in the pre-set region on the touch screen. Referring to FIG. 12A, the interruption for the rubbing gesture is detected in FIG. 12A. That is, as in FIG. 12A, the controller 110 may detect that the continuous touch 512 in the pre-set region 514 on the touch screen is removed or stopped. That is, the controller 110 may detect that the user takes the user's finger that performs the touch 512 off from the touch screen or stops the finger.

At this time, when the interruption for the rubbing gesture is detected, displaying the preview on the touch screen is stopped in step S250. However, when the interruption for the rubbing gesture is not detected, the process returns to step S230 to continuously display the preview on the touch screen.

Accordingly, when the interruption for the rubbing gesture is detected in step S240, the controller 110 may stop displaying the preview on the touch screen. That is, as in FIG. 12B, the controller 110 may remove the preview images 610, 612 and 614 that have been displayed on the touch screen as illustrated in FIG. 12A. Alternatively, the controller 110 may not display the image next to the preview images 610, 612 and 614 while continuously displaying the preview images 610, 612 and 614 that have been displayed on the touch screen as illustrated in FIG. 12A.

Next, it is confirmed whether the rubbing gesture is detected again in step S260. The controller 110 may confirm whether the rubbing gesture is detected again on the touch screen. As in FIG. 13A, the controller 110 may confirm that the rubbing gesture 512 is detected again on the touch screen.

When it is confirmed that the rubbing gesture is detected again, the preview is displayed on the touch screen in step S270. On the contrary, when the rubbing gesture is not detected again, the process is ended.

Figure 13B:
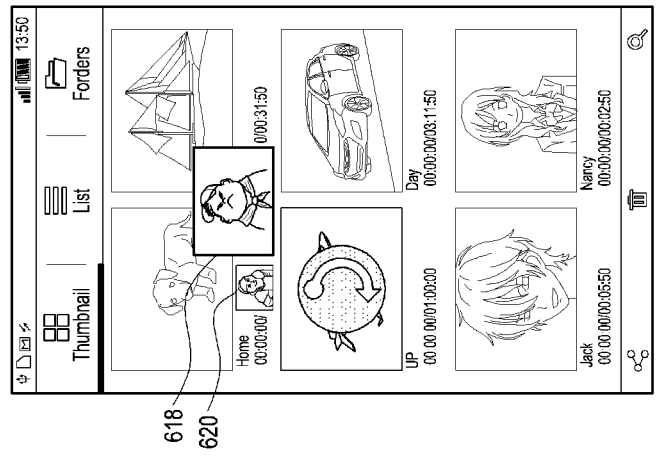
Figure 13A:
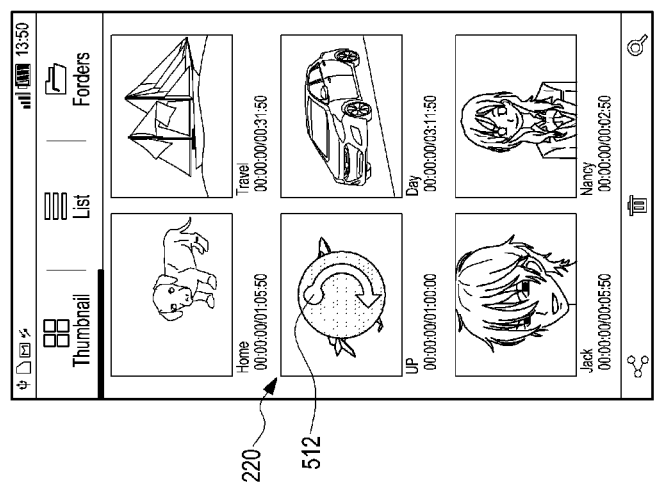

Accordingly, when it is confirmed that the rubbing gesture is detected again, the controller 110 may display the preview on the touch screen again. That is, when it is confirmed that the rubbing gesture is detected again in FIG. 13A, the controller 110 may display the preview on the touch screen again as in FIG. 13B. Accordingly, the controller 110 may sequentially display the preview of the video contents 220 in such a manner that the images next to the first image 610, the second image 612 and the third image 614 illustrated in FIG. 11B are displayed. For example, as illustrated in FIG. 13B, the controller 110 may sequentially display again the preview of the video contents 220 in such a manner that a fourth image 618 corresponding to an image next to the third image 614 and a fifth image 620 corresponding to an image next to the fourth image 618 may be sequentially displayed.

Thus, according to the present exemplary embodiment, there is an advantage in that when the rubbing gesture is detected, the preview of the video contents is displayed on the touch screen, when the interruption for the rubbing gesture is detected, displaying the preview on the touch screen is stopped, and when the rubbing gesture is detected again, the preview may be displayed again on the touch screen.

FIGS. 14A and 14B, and 15A and 15B illustrate scenes according to a mobile apparatus control method that provides a preview by detecting a rubbing gesture according to still an exemplary embodiment of the present invention.

Referring to FIG. 4 again, the mobile apparatus control method that provides a preview by detecting a rubbing gesture first displays a thumb-nail of video contents on a touch screen in step S110. The controller 110 of the mobile apparatus 100 may display the thumb-nail on the touch screen 190.

The video contents include a plurality of images reproduced sequentially according to a time sequence. The plurality of images may be sequentially displayed to be reproduced on the touch screen 190 according to the time sequence. That is, the controller 110 may provide the video contents to a user by sequentially displaying the plurality of images on the touch screen 190 according to the time sequence.

In addition, the video contents may include information related to a plurality of images, titles and reproducing time. At this time, the controller 110 may form a thumb-nail of the video contents by extracting important information from the information included in the video contents. Accordingly, the thumb-nail of the video contents includes important information related to the video contents. For example, the important information of the video contents may include the title, reproducing time and the first image of the video contents. For example, the controller 110 may display the thumb-nail of the video contents including the title, reproducing time and the first image of the video contents on the touch screen 190. Accordingly, when the thumb-nail of the video contents is provided, the user may grasp the entire content about the video contents by recognizing the important information of the video contents merely by viewing only the thumb-nail of the video contents.

Figures 14A, 14B:
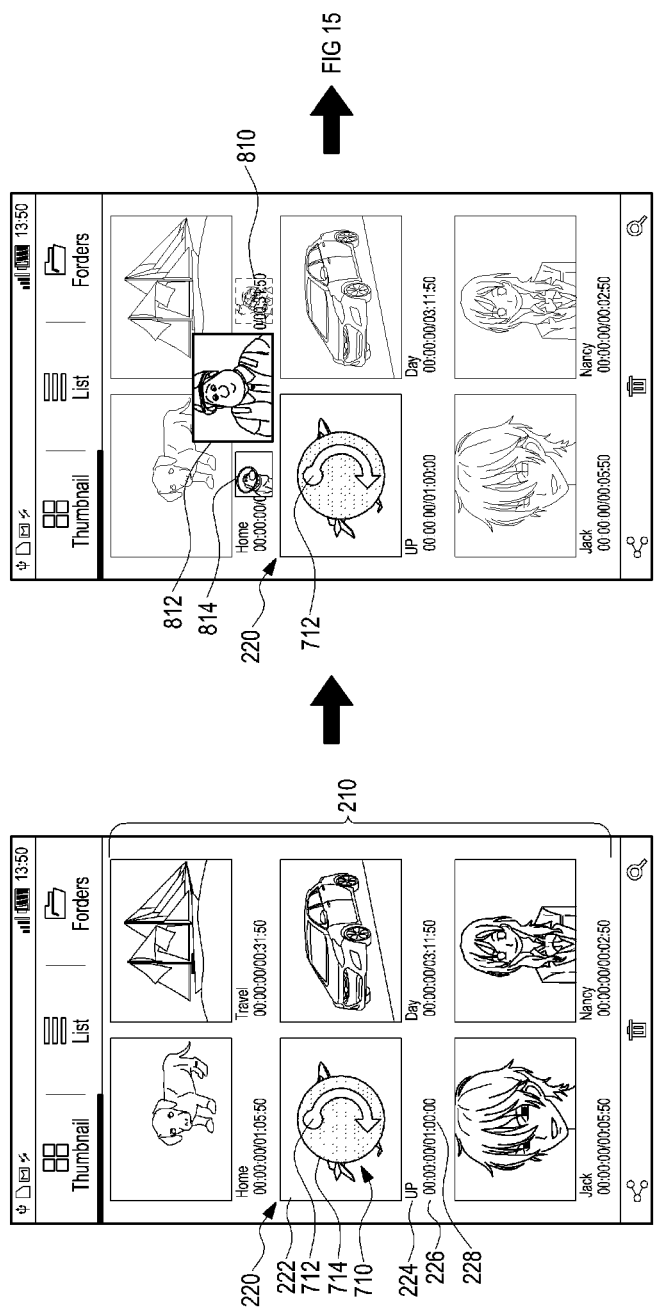

Referring to FIG. 14A, the controller 110 displays the thumb-nail 210 of the video contents on the touch screen 190. At this time, the thumb-nail 210 of the video contents includes important information related to the video contents. For example, the important information related to the video contents may include the title, the reproducing time and the first image of the video contents. Accordingly, as illustrated in FIG. 14A, the controller 110 may display the thumb-nail of the video contents 220 that includes the title 224, the reproducing time in which the start time 226 and the end time 228 are included, and the first image 222 of the video contents on the touch screen 190. For example, as illustrated in FIG. 14A, the controller 110 may display at least one thumb-nail of the video contents 220 on the touch screen 190. In FIG. 14A, six thumb-nails of the video contents 220 are displayed. In addition, the title 224 of the video contents such as "Up", the reproducing time in which the start time 226 of the video contents 220 such as "00:00:00" and the end time 228 such as "01:00:00" of the video contents 220 are included, and the first images 222 of the video contents 220 such as an "airplane" may be included in the thumb-nail of the video contents 220 of FIG. 14A, and displayed on the touch screen 190.

Next, a rubbing gesture on the touch screen where the thumb-nail of the video contents is displayed is detected in step S120. The controller 110 detects the rubbing gesture on the thumb-nail of the video contents displayed on the touch screen. For example, as in FIG. 14A, the controller 110 may detect a rubbing gesture 710 on the thumb-nail of the video contents 220 displayed on the touch screen 190.

At this time, the rubbing gesture may be a continuous touch in a pre-set region on the touch screen. For example, as in FIG. 14A, the rubbing gesture may be a continuous touch 712 of, for example, a circular form in the pre-set region 714. Here, the continuous touch means a touch that is not ended after the detection of the touch input is started.

That is, in the user's position, the continuous touch means that the user continuously touches the touch screen without taking the user's finger off the touch screen after the user has started a touch on the screen by the finger. Accordingly, the rubbing gesture may mean a touch that does not end a touch input after the touch input has been started in a pre-set region on the touch screen.

In addition, the rubbing gesture may be a continuous touch rotating in the pre-set region on the touch screen. For example, as in FIG. 14A, the rubbing gesture may be a continuous touch 712 of, for example, a circular form rotating clockwise in a pre-set region 714. At this time, although the rubbing gesture is the continuous touch rotating clockwise in FIG. 14A, the rubbing gesture may be a continuous touch rotating counterclockwise. As described above, the continuous touch means a touch that does not end the touch input after the detection of the touch input has been started. Accordingly, the rubbing gesture may mean a touch in which the touch input is not ended after the touch input rotating in the pre-set region on the touch screen has been started.

At this time, when the rubbing gesture is detected on the thumb-nails of the video contents displayed on the touch screen, the process proceeds to step S130. However, when the rubbing gesture is not detected, the process is ended.

Next, when the rubbing gesture is detected, the preview of the video contents is displayed on the touch screen in step S130. When the rubbing gesture is detected, the controller 110 displays the preview of the video contents on the touch screen. As described above, the video contents include a plurality of images which are sequentially reproduced according to the time sequence. At this time, the controller 110 may sort preview images among the plurality of images included in the video contents. In addition, the controller 110 may display the preview by sequentially displaying the preview images sorted among the plurality of images included in the video contents.

At this time, the preview may be displayed on the touch screen in such a manner that the time interval of the preview images of the video contents is adjusted to correspond to the speed of the rubbing gesture. For example, the preview may be displayed in such a manner that when the speed of the rubbing gesture becomes slower, the time interval of the preview images of the video contents is reduced, and when the speed of the rubbing gesture becomes faster, the time interval of preview images of the video contents is increased.

For example, the controller 110 may display the preview images 810, 812 and 814 on the touch screen as in FIG. 14B. However, when the speed of the rubbing gesture of FIG. 15A is faster than that of the rubbing gesture of FIG. 14A, the preview images 812, 814 and 816 of the video contents of FIG. 15A may be displayed in such a manner that the time interval of the preview images 812, 814 and 816 of the video contents of FIG. 15A is increased to be longer than the time interval of the preview images 810, 812 and 814 of the video contents of FIG. 14B. For example, when the time interval of the first preview image 810 and the second preview image 812 illustrated in FIG. 14B is 5 seconds, the time interval of the third preview image 812 and the fourth preview image 814 illustrated in FIG. 15B may be 10 seconds. That is, when increasing the speed of the rubbing gesture, the user may view the preview of the video contents in a faster speed in a state where the time interval of the preview images is increased. On the contrary, when reducing the speed of the rubbing gesture, the user may view the preview of the video contents in a slower speed in a state where the time interval of the preview images is reduced.

In addition, as in FIG. 15B, when the speed of the rubbing gesture of FIG. 15B is slower than that of the rubbing gesture of FIG. 15A again, the preview images 814, 816 and 818 of the video contents of FIG. 15B may be displayed in a state where the time interval of the preview images 814, 816 and 818 of the video contents of FIG. 15B is reduced to be shorter than the time interval of the preview images 812, 814 and 816 of the video contents of FIG. 15A.

Thus, according to the present exemplary embodiment, there is an advantage in that the preview may be displayed on the touch screen in such a manner that the time interval of the preview images of the video contents may be adjusted to correspond to the speed of the rubbing gesture.

Also, according to the present exemplary embodiment, there is an advantage in that, when the speed of the rubbing gesture becomes slower, the preview may be displayed in a state where the time interval of the preview images of the video contents is reduced and when the speed of the rubbing gesture becomes faster, the preview may be displayed in a state where the time interval of the preview images of the video contents is increased.

FIGS. 16A and 16B, and 17A and 17B are views illustrating a mobile apparatus control method that provides a preview by detecting a rubbing gesture according to an exemplary embodiment of the present invention.

Referring to FIG. 4 again, the mobile apparatus control method that provides a preview by detecting a rubbing gesture first displays a thumb-nail of video contents on a touch screen in step S110. The controller 110 of the mobile apparatus 100 may display the thumb-nail on the touch screen 190.

The video contents include a plurality of images reproduced sequentially according to a time sequence. The plurality of images may be sequentially displayed to be reproduced on the touch screen 190 according to the time sequence. That is, the controller 110 may provide the video contents to a user by sequentially displaying the plurality of images on the touch screen 190 according to the time sequence.

In addition, the video contents may include information related to a plurality of images, titles and reproducing time. At this time, the controller 110 may form a thumb-nail of the video contents by extracting important information from the information included in the video contents. Accordingly, the thumb-nail of the video contents includes important information related to the video contents. For example, the important information of the video contents may include the title, reproducing time and the first image of the video contents. For example, the controller 110 may display the thumb-nail of the video contents including the title, reproducing time and the first image of the video contents on the touch screen 190. Accordingly, when the thumb-nail of the video contents is provided, the user may grasp the entire content about the video contents by recognizing the important information of the video contents merely by viewing only the thumb-nail of the video contents.

Figures 17A, 17B:
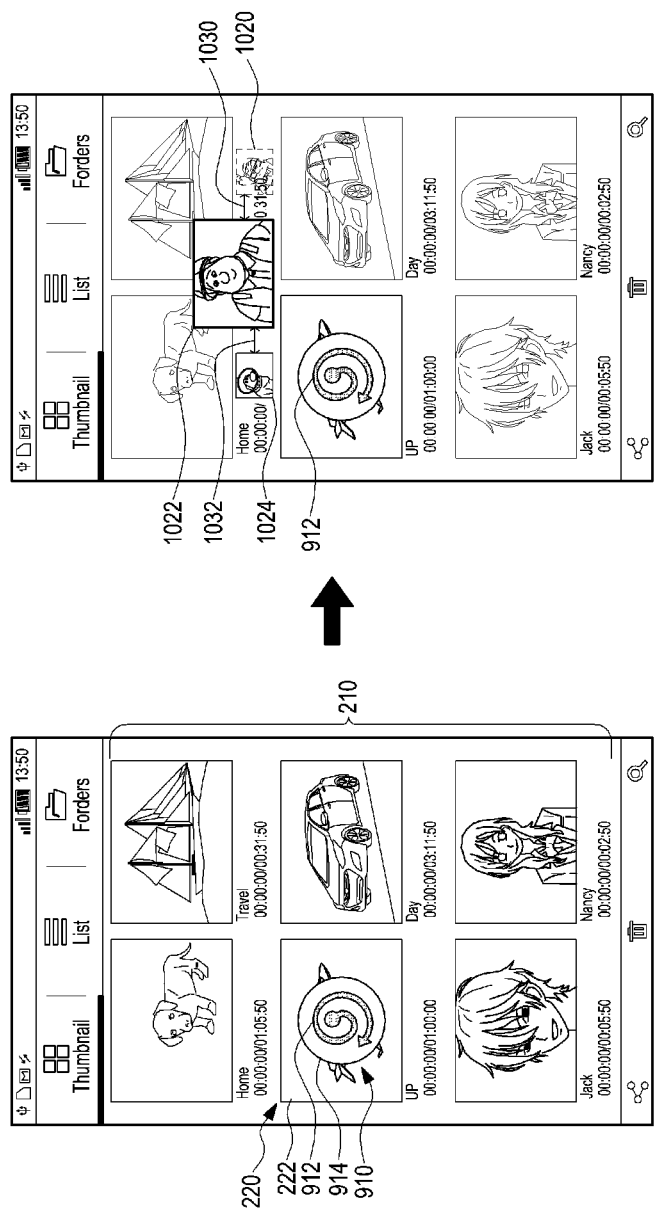

Referring to FIGS. 16A and 17A, the controller 110 displays the thumb-nail 210 of the video contents on the touch screen 190. At this time, the thumb-nail 210 of the video contents includes important information related to the video contents. For example, the important information related to the video contents may include the title, the reproducing time and the first image of the video contents. Accordingly, as illustrated in FIGS. 16A and 17A, the controller 110 may display the thumb-nail of the video contents that includes the title 224, the reproducing time in which the start time 226 and the end time 228 are included, and the first image 222 of the video contents on the touch screen 190. For example, as illustrated in FIGS. 16A and 17A, the controller 110 may display at least one thumb-nail 210 of the video contents on the touch screen 190. In FIGS. 16A and 17A, six thumb-nails 210 of the video contents are displayed. In addition, the title 224 of the video contents such as "Up", the reproducing time in which the start time 226 of the video contents 220 such as "00:00:00" and the end time 228 such as "01:00:00" of the video contents 220 are included, and the first images 222 of the video contents 220 such as an "airplane" may be included in the thumb-nail 210 of the video contents of FIGS. 16A and 17A, and displayed on the touch screen 190.

Next, a rubbing gesture on the touch screen where the thumb-nail of the video contents is displayed is detected in step S120. The controller 110 may detect the rubbing gesture on the thumb-nail of the video contents displayed on the touch screen. For example, as in FIGS. 16A and 17A, the controller 110 may detect a rubbing gesture 910 on the thumb-nail of the video contents 220 displayed on the touch screen 190.

At this time, the rubbing gesture may be a continuous touch in a pre-set region on the touch screen. For example, as in FIGS. 16A and 17A, the rubbing gesture may be a continuous touch 912 of, for example, a circular form in the pre-set region 914. Here, the continuous touch means a touch that is not ended after the detection of the touch input is started. That is, in the user's position, the continuous touch means that the user continuously touches the touch screen without taking the user's finger off the touch screen after the user has started a touch on the screen by the finger. Accordingly, the rubbing gesture may mean a touch that does not end a touch input after the touch input has been started in a pre-set region on the touch screen.

In addition, the rubbing gesture may be a continuous touch rotating in the pre-set region on the touch screen. For example, as in FIGS. 16A and 17A, the rubbing gesture may be a continuous touch 912 of, for example, a circular form rotating clockwise in a pre-set region 914. At this time, although the rubbing gesture is the continuous touch rotating clockwise in FIGS. 16A and 17A, the rubbing gesture may be a continuous touch rotating counterclockwise. As described above, the continuous touch means a touch that does not end the touch input after the detection of the touch input has been started. Accordingly, the rubbing gesture may mean a touch in which the touch input is not ended after the touch input rotating in the pre-set region on the touch screen has been started.

At this time, when the rubbing gesture is detected on the thumb-nails of the video contents displayed on the touch screen, the process proceeds to step S130. However, when the rubbing gesture is not detected, the process is ended.

Next, when the rubbing gesture is detected, the preview of the video contents is displayed on the touch screen in step S130. When the rubbing gesture is detected, the controller 110 displays the preview of the video contents on the touch screen. As described above, the video contents include a plurality of images which are sequentially reproduced according to the time sequence. At this time, the controller 110 may sort preview images among the plurality of images included in the video contents. In addition, the controller 110 may display the preview by sequentially displaying the preview images sorted among the plurality of images included in the video contents.

At this time, the preview may be displayed in such a manner that the positional spacings between the preview images of the video contents may be adjusted to correspond to the speed of the rubbing gesture. For example, the preview may be displayed in such a manner that when the speed of the rubbing gesture becomes slower, the positional spacings of the preview images of the video contents may be reduced, and when the speed of the rubbing gesture becomes faster, the positional spacings of the preview images of the video contents may be increased.

For example, when the speed of the rubbing gesture of FIG. 17A is faster than the speed of the rubbing gesture of FIG. 16A, the positional spacings 1030 and 1032 of the preview images 1020, 1022 and 1024 of the video contents of FIG. 17B may be displayed to be broader than the positional spacings 1016 and 1018 of the preview images 1010, 1012 and 1014 of the video contents of FIG. 16B. That is, when the user increases the speed of the rubbing gesture, the positional spacings of the preview images of the video contents are displayed to be broader so that the user may recognize that the speed of the rubbing gesture becomes faster.

Thus, according to the present exemplary embodiment, there is an advantage in that the preview may be displayed in such a manner that the positional spacings of the preview images of the video contents may be adjusted to correspond to the speed of the rubbing gesture.

Also, according to the present exemplary embodiment, there is an advantage in that the preview is displayed in such a manner that when the speed of the rubbing gesture becomes slower, the positional spacings of the preview images of the video contents are reduced, and when the speed of the rubbing gesture becomes faster, the positional spacings of the preview images of the video contents are increased, thereby allowing the user to recognize the speed of the rubbing gesture.

FIGS. 18A and 18B are views illustrating scenes according to a mobile apparatus control method that provides a preview by detecting a rubbing gesture according to an exemplary embodiment of the present invention.

Referring to FIG. 4 again, the mobile apparatus control method that provides a preview by detecting a rubbing gesture first displays a thumb-nail of video contents on a touch screen in step S110. The controller 110 of the mobile apparatus 100 may display the thumb-nail on the touch screen 190.

The video contents include a plurality of images reproduced sequentially according to a time sequence. The plurality of images may be sequentially displayed to be reproduced on the touch screen 190 according to the time sequence. That is, the controller 110 may provide the video contents to a user by sequentially displaying the plurality of images on the touch screen 190 according to the time sequence.

In addition, the video contents may include information related to a plurality of images, titles and reproducing time. At this time, the controller 110 may form a thumb-nail of the video contents by extracting important information from the information included in the video contents. Accordingly, the thumb-nail of the video contents includes important information related to the video contents. For example, the important information of the video contents may include the title, reproducing time and the first image of the video contents. For example, the controller 110 may display the thumb-nail of the video contents including the title, reproducing time and the first image of the video contents on the touch screen 190. Accordingly, when the thumb-nail of the video contents is provided, the user may grasp the entire content about the video contents by recognizing the important information of the video contents merely by viewing only the thumb-nail of the video contents.

Referring to FIGS. 18A and 18B, the controller 110 displays the thumb-nail 210 of the video contents on the touch screen 190. At this time, the thumb-nail 210 of the video contents includes important information related to the video contents. For example, the important information related to the video contents may include the title, the reproducing time and the first image of the video contents. Accordingly, as illustrated in FIG. 18A, the controller 110 may display the thumb-nail 210 of the video contents that includes the title 224, the reproducing time in which the start time 226 and the end time 228 are included, and the first image 222 of the video contents on the touch screen 190. For example, as illustrated in FIG. 18A, the controller 110 may display at least one thumb-nail 210 of the video contents on the touch screen 190. In FIG. 18A, six thumb-nails 210 of the video contents are displayed. In addition, the title 224 of the video contents such as "Up", the reproducing time in which the start time 226 of the video contents such as "00:00:00" and the end time 228 such as "01:00:00" of the video contents are included, and the first images 222 of the video contents such as an "airplane" may be included in the thumb-nail 210 of the video contents of FIG. 18A, and displayed on the touch screen 190.

Next, a rubbing gesture on the touch screen where the thumb-nail of the video contents is displayed is detected in step S120. The controller 110 may detect the rubbing gesture on the thumb-nail of the video contents displayed on the touch screen. For example, as in FIG. 18A, the controller 110 may detect a rubbing gesture 1110 on the thumb-nail of the video contents 220 displayed on the touch screen 190.

At this time, the rubbing gesture may be a continuous touch in a pre-set region on the touch screen. For example, as in FIG. 18A, the rubbing gesture may be a continuous touch 1112 of, for example, a circular form in the pre-set region 1114. Here, the continuous touch means a touch that is not ended after the detection of the touch input is started. That is, in the user's position, the continuous touch means that the user continuously touches the touch screen without taking the user's finger off the touch screen after the user has started a touch on the screen by the finger. Accordingly, the rubbing gesture may mean a touch in which a touch input is not ended after the touch input has been started in a pre-set region on the touch screen.

In addition, the rubbing gesture may be a continuous touch rotating in the pre-set region on the touch screen. For example, as in FIG. 18A, the rubbing gesture may be a continuous touch 1112 of, for example, a circular form rotating clockwise in a pre-set region 1114. At this time, although the rubbing gesture is the continuous touch rotating clockwise in FIG. 18A, the rubbing gesture may be a continuous touch rotating counterclockwise. As described above, the continuous touch means a touch in which the touch input is not ended after the detection of the touch input has been started. Accordingly, the rubbing gesture may mean a touch in which the touch input is not ended after the touch input rotating in the pre-set region on the touch screen has been started.

At this time, when the rubbing gesture is detected on the thumb-nails of the video contents displayed on the touch screen, the process proceeds to step S130. However, when the rubbing gesture is not detected, the process is ended.

Next, when the rubbing gesture is detected, the preview of the video contents is displayed on the touch screen in step S130. When the rubbing gesture is detected, the controller 110 displays the preview of the video contents on the touch screen. As described above, the video contents include a plurality of images which are sequentially reproduced according to the time sequence. At this time, the controller 110 may sort preview images among the plurality of images included in the video contents. In addition, the controller 110 may display the preview by sequentially displaying the preview images sorted among the plurality of images included in the video contents.

At this time, the preview may displayed on the touch screen in such a manner that the positions of the preview images of the video contents are arranged, in response to the consistent direction of the rubbing gesture, in a direction which is the same as the consistent direction of the rubbing gesture. For example, when the consistent direction of the rubbing gesture is a clockwise direction in a circular shape, the positions of the preview images of the video contents may be arranged in the clockwise circular shape and displayed on the touch screen.

For example, as in FIG. 18B, when the consistent direction of the rubbing gesture 1112 is the clockwise direction in the circular shape 1120, the positions of the preview images 1210, 1212 and 1214 of the video contents may be arranged in the close circular shape 1114 and displayed on the touch screen.

Thus, according to the present exemplary embodiment, there is an advantage in that the positions of the preview images of the video contents may be arranged, in response to the consistent direction of the rubbing gesture, in a direction which is the same as the consistent direction of the rubbing gesture and displayed on the touch screen.

It will be appreciated that the exemplary embodiments of the present invention may be implemented in a form of hardware, software, or a combination of hardware and software. Such arbitrary software may be stored, for example, in a volatile or non-volatile storage device such as an ROM, or, for example, a memory such as an RAM, a memory chip, a memory device or an integrated circuit, or a storage medium such as a CD, a DVD, a magnetic disc or a magnetic tape that may be optically or magnetically recorded and readable with a machine (for example, a computer) regardless of whether the software is erasable or rewritable or not. Also, it will be appreciated that the exemplary embodiments of the present invention may be implemented by a computer or a portable terminal which includes a controller and a memory, in which the memory may be an example of a storage medium that is readable by a machine that is suitable for storing one or more programs that include instructions for implementing the exemplary embodiments of the present invention. Accordingly, the present invention includes a program that includes a code for implementing an apparatus or a method defined in any claim in the present specification and a machine (e.g., a computer) readable storage medium that stores such a program. Further, the program may be electronically transmitted through a medium such as a communication signal transferred through wired or wireless connection, and the present invention properly includes that equivalent to the program.

In addition, the above-described electronic apparatus may receive and store the program from a program supply apparatus wiredly or wirelessly connected thereto. The program supply apparatus may include a program that includes instructions to execute the exemplary embodiments of the present invention, a memory that stores information or the like required for the exemplary embodiments of the present invention, a communication unit that conducts wired or wireless communication with the electronic apparatus, and a controller that transmits a corresponding program to a transmission/reception apparatus in response to the request from the electronic apparatus or automatically.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile apparatus control method that provides a preview by detecting a gesture, the method comprising:
    displaying a thumb-nail of video content on a touch screen;
    detecting a rubbing gesture on the thumb-nail of the video content, wherein the rubbing gesture comprises a continuously moving touch within a pre-set region that includes at least a part of the thumb-nail on the touch screen; and
    displaying the preview of the video content on the touch screen, preview images of the preview changing during the rubbing gesture,
    wherein the preview is displayed such that a positional spacing between the preview images of the video content is adjusted to correspond to a speed of the rubbing gesture, while maintaining a same number of preview images.

2. The method of claim 1, wherein the rubbing gesture further comprises a continuously rotating touch within the pre-set region on the touch screen.

3. The method of claim 1, wherein, when the preview of the video content is displayed on the touch screen, the preview is displayed at a pre-set position adjacent to the thumb-nail of the video content.

4. The method of claim 1, wherein, displaying the preview of the video content, the preview appears and disappears according to a time sequence of the video content, and
    wherein the appearance and disappearance comprises concurrently performing:
        adding a third image to the preview,
        maintaining a second image of the preview, and
        removing a first image of the preview.

5. The method of claim 1, further comprising:
    stopping the displaying of the preview on the touch screen when interruption for the rubbing gesture is detected; and
    displaying the preview on the touch screen again when the rubbing gesture is detected again.

6. The method of claim 1, wherein the preview is displayed such that a time interval of preview images of the video content is adjusted to correspond to the speed of the rubbing gesture.

7. The method of claim 1, wherein the preview is displayed such that a time interval of preview images of the video content is reduced when the speed of the rubbing gesture becomes slower and increased when the speed of the rubbing gesture becomes faster.

8. The method of claim 1, wherein the preview is displayed such that, when the speed of the rubbing gesture becomes slower, a positional spacing of preview images of the video content is reduced, and when the speed of the rubbing gesture becomes faster, the positional spacing of the preview images of the video content is increased.

9. The method of claim 1, wherein the preview is displayed such that the positions of preview images of the video content are arranged, in response to a consistent direction of the rubbing gesture, in a direction which is the same as the consistent direction of the rubbing gesture.

10. A mobile apparatus that detects a rubbing gesture to provide a preview, the mobile apparatus comprising:
   a touch screen configured to display a thumb-nail of video content; and
   a processor configured to:
      detect a rubbing gesture on the thumb-nail of the video content, wherein the rubbing gesture comprises a continuously moving touch within a pre-set region that includes at least a part of the thumb-nail on the touch screen, and
      display the preview of the video content on the touch screen, preview images of the preview changing during the rubbing gesture,
      wherein the processor is configured to adjust a positional spacing between the preview images of the video content to correspond to a speed of the rubbing gesture, while maintaining a same number of preview images.

11. The apparatus of claim 10, wherein the rubbing gesture further comprises a continuously rotating touch within the pre-set region on the touch screen.

12. The apparatus of claim 10, wherein, when the preview of the video content is displayed on the touch screen, the processor is further configured to display the preview at a pre-set position adjacent to the thumb-nail of the video content.

13. The apparatus of claim 10, wherein, when the processor is displaying the preview of the video content, the preview appears and disappears according to a time sequence of the video content, and wherein the appearance and disappearance comprises concurrently performing:
   adding a third image to the preview,
   maintaining a second image of the preview, and
   removing a first image of the preview.

14. The apparatus of claim 10, wherein the processor is further configured to stop the displaying of the preview on the touch screen when interruption for the rubbing gesture is detected, and display the preview on the touch screen again when the rubbing gesture is detected again.

15. The apparatus of claim 10, wherein the processor is further configured to adjust a time interval of preview images of the video content to correspond to the speed of the rubbing gesture so as to display the time interval.

16. The apparatus of claim 10, wherein the processor is further configured to reduce a time interval of preview images of the video content when the speed of the rubbing gesture becomes slower and increase the time interval of the preview images when the speed of the rubbing gesture becomes faster.

17. The apparatus of claim 10, wherein the processor is further configured to reduce positional spacing of preview images of the video content when the speed of the rubbing gesture becomes slower and increase the positional spacing of the preview images of the video content when the speed of the rubbing gesture becomes faster.

18. The apparatus of claim 10, wherein the processor is further configured to arrange, in response to a consistent direction of the rubbing gesture, the positions of preview images of the video content in a direction which is the same as the consistent direction of the rubbing gesture and display the preview images.

* * * * *